(12) United States Patent
Sweany et al.

(10) Patent No.: US 10,223,935 B2
(45) Date of Patent: Mar. 5, 2019

(54) USING TELEMATICS DATA INCLUDING POSITION DATA AND VEHICLE ANALYTICS TO TRAIN DRIVERS TO IMPROVE EFFICIENCY OF VEHICLE USE

(71) Applicant: ZONAR SYSTEMS, INC., Seattle, WA (US)

(72) Inventors: Tim Sweany, Renton, WA (US); Charles Michael McQuade, Issaquah, WA (US)

(73) Assignee: ZONAR SYSTEMS, INC., Seattle, WA (US)

( * ) Notice: Subject to any disclaimer, the term of this patent is extended or adjusted under 35 U.S.C. 154(b) by 0 days.

(21) Appl. No.: 16/044,475

(22) Filed: Jul. 24, 2018

(65) Prior Publication Data

US 2018/0330633 A1 Nov. 15, 2018

Related U.S. Application Data

(63) Continuation of application No. 14/214,008, filed on Mar. 14, 2014, now Pat. No. 10,056,008, which is a (Continued)

(51) Int. Cl.
G09B 9/04 (2006.01)
G09B 19/16 (2006.01)

(52) U.S. Cl.
CPC .................. G09B 19/167 (2013.01)

(58) Field of Classification Search
CPC ..... G09B 19/167; G09B 9/04; G06F 11/3065; G06F 17/00
See application file for complete search history.

(56) References Cited

U.S. PATENT DOCUMENTS 3,573,620 A 4/1971 Ashley et al.
3,990,067 A 11/1976 Van Dusen et al.
(Continued)

FOREIGN PATENT DOCUMENTS

CA 2138378 A1 11/1994
CA 2 326 892 A1 10/1999
(Continued)

OTHER PUBLICATIONS

"Nextel, Motorola and Symbol Technologies Offer First Wireless Bar Code Scanner for Mobile Phones," The Auto Channel, Jun. 11, 2003, URL=https://www.theautochannel.com/news/2003/06/11/162927.html, download date Aug. 28, 2017, 4 pages.
(Continued)

*Primary Examiner* — Jerry-Daryl Fletcher
(74) *Attorney, Agent, or Firm* — Seed IP Law Group LLP

(57) ABSTRACT

A driver efficiency score is based on defining at least metric, collecting data related to the metric during the driver's operation of a vehicle, determining how often the driver's deviated from an optimal standard for that metric, and then reducing the efficiency score based on how often the driver's deviated from the optimal standard, to express the result as an efficiency score of 100% or less (100% meaning the driver never varied from the optimum). The efficiency score for a specific trip is reported along with a loss in dollars due to an efficiency score of less than 100%. Useful metrics include how often the driver deviated from an optimal RPM range (a sweet zone) for the vehicle being operated, how often the driver operated a vehicle at highway speeds without using cruise control, and how often the driver operated a vehicle in excess of a predetermined maximum speed.

19 Claims, 14 Drawing Sheets

Related U.S. Application Data continuation-in-part of application No. 13/725,128, filed on Dec. 21, 2012, now Pat. No. 9,412,282, which is a continuation-in-part of application No. 13/725,266, filed on Dec. 21, 2012, now Pat. No. 9,489,280, which is a continuation-in-part of application No. 13/725,886, filed on Dec. 21, 2012, which is a continuation-in-part of application No. 13/725,183, filed on Dec. 21, 2012, now Pat. No. 9,170,913, which is a continuation-in-part of application No. 13/719,211, filed on Dec. 18, 2012, which is a continuation-in-part of application No. 13/719,208, filed on Dec. 18, 2012, now Pat. No. 9,384,111, which is a continuation-in-part of application No. 13/719,218, filed on Dec. 18, 2012, now Pat. No. 9,280,435, which is a continuation-in-part of application No. 12/836,487, filed on Jul. 14, 2010, now Pat. No. 9,230,437, which is a continuation-in-part of application No. 12/724,232, filed on Mar. 15, 2010, now Pat. No. 8,972,179, which is a continuation-in-part of application No. 11/675,502, filed on Feb. 15, 2007, now Pat. No. 7,680,595, which is a continuation-in-part of application No. 11/425,222, filed on Jun. 20, 2006, now Pat. No. 7,564,375.

(60) Provisional application No. 61/800,726, filed on Mar. 15, 2013, provisional application No. 61/802,191, filed on Mar. 15, 2013, provisional application No. 61/580,197, filed on Dec. 24, 2011, provisional application No. 61/580,190, filed on Dec. 23, 2011.

(56) References Cited

U.S. PATENT DOCUMENTS

| | | |
|---|---|---|
| 4,025,791 A | 5/1977 | Lennington et al. |
| 4,092,718 A | 5/1978 | Wendt |
| 4,258,421 A | 3/1981 | Juhasz et al. |
| 4,258,521 A | 3/1981 | Fricker et al. |
| 4,263,945 A | 4/1981 | Van Ness |
| 4,325,057 A | 4/1982 | Bishop |
| 4,469,149 A | 9/1984 | Walkey et al. |
| 4,602,127 A | 7/1986 | Neely et al. |
| 4,651,157 A | 3/1987 | Gray et al. |
| 4,658,371 A | 4/1987 | Walsh et al. |
| 4,688,244 A | 8/1987 | Hannon et al. |
| 4,750,197 A | 6/1988 | Denekamp et al. |
| 4,763,356 A | 8/1988 | Day, Jr. et al. |
| 4,799,162 A | 1/1989 | Shinkawa et al. |
| 4,804,937 A | 2/1989 | Barbiaux et al. |
| 4,814,711 A | 3/1989 | Olsen et al. |
| 4,846,233 A | 7/1989 | Fockens |
| 4,897,792 A | 1/1990 | Hosoi |
| 4,934,419 A | 6/1990 | Lamont et al. |
| 4,935,195 A | 6/1990 | Palusamy et al. |
| 5,006,847 A | 4/1991 | Rush et al. |
| 5,058,044 A | 10/1991 | Stewart et al. |
| 5,068,656 A | 11/1991 | Sutherland |
| 5,072,380 A | 12/1991 | Randelman et al. |
| 5,120,942 A | 6/1992 | Holland et al. |
| 5,128,651 A | 7/1992 | Heckart |
| 5,132,906 A | 7/1992 | Sol et al. |
| 5,163,000 A | 11/1992 | Rogers et al. |
| 5,204,819 A | 4/1993 | Ryan |
| 5,206,643 A | 4/1993 | Eckelt |
| 5,223,844 A | 6/1993 | Mansell et al. |
| 5,243,323 A | 9/1993 | Rogers |
| 5,243,343 A | 9/1993 | Moriyasu |
| 5,321,629 A | 6/1994 | Shirata et al. |
| 5,337,003 A | 8/1994 | Carmichael et al. |
| 5,359,522 A | 10/1994 | Ryan |
| 5,359,528 A | 10/1994 | Haendel et al. |
| 5,394,136 A | 2/1995 | Lammers et al. |
| 5,399,844 A | 3/1995 | Holland |
| 5,442,553 A | 8/1995 | Parrillo |
| 5,459,304 A | 10/1995 | Eisenmann |
| 5,459,660 A | 10/1995 | Berra |
| 5,479,479 A | 12/1995 | Braitberg et al. |
| 5,488,352 A | 1/1996 | Jasper |
| 5,499,182 A | 3/1996 | Ousborne |
| 5,541,845 A | 7/1996 | Klein |
| 5,546,305 A | 8/1996 | Kondo |
| 5,557,254 A | 9/1996 | Johnson et al. |
| 5,557,268 A | 9/1996 | Hughes et al. |
| 5,557,628 A | 9/1996 | Kuba et al. |
| 5,572,192 A | 11/1996 | Berube |
| 5,585,552 A | 12/1996 | Heuston et al. |
| 5,594,650 A | 1/1997 | Shah et al. |
| 5,596,501 A | 1/1997 | Comer et al. |
| 5,600,323 A | 2/1997 | Boschini |
| 5,610,596 A | 3/1997 | Petitclerc |
| 5,623,258 A | 4/1997 | Dorfman |
| 5,629,678 A | 5/1997 | Gargano et al. |
| 5,657,010 A | 8/1997 | Jones |
| 5,671,158 A | 9/1997 | Fournier et al. |
| 5,680,328 A | 10/1997 | Skorupski et al. |
| 5,711,712 A | 1/1998 | Graf |
| 5,719,771 A | 2/1998 | Buck et al. |
| 5,731,893 A | 3/1998 | Dominique |
| 5,732,074 A | 3/1998 | Spaur et al. |
| 5,742,915 A | 4/1998 | Stafford |
| 5,745,049 A | 4/1998 | Akiyama et al. |
| 5,748,106 A | 5/1998 | Schoenian et al. |
| 5,754,965 A | 5/1998 | Hagenbuch |
| 5,758,299 A | 5/1998 | Sandborg et al. |
| 5,758,300 A | 5/1998 | Abe |
| 5,768,382 A | 6/1998 | Schneier et al. |
| 5,781,871 A | 7/1998 | Mezger et al. |
| 5,794,164 A | 8/1998 | Beckert et al. |
| 5,804,937 A | 9/1998 | Sasajima et al. |
| 5,808,565 A | 9/1998 | Matta et al. |
| 5,809,437 A | 9/1998 | Breed |
| 5,815,071 A | 9/1998 | Doyle |
| 5,835,871 A | 11/1998 | Smith et al. |
| 5,838,251 A | 11/1998 | Brinkmeyer et al. |
| 5,839,112 A | 11/1998 | Schreitmueller et al. |
| 5,867,404 A | 2/1999 | Bryan |
| 5,871,871 A | 2/1999 | Hogan et al. |
| 5,874,891 A | 2/1999 | Lowe |
| 5,884,202 A | 3/1999 | Arjomand |
| 5,890,061 A | 3/1999 | Timm et al. |
| 5,890,080 A | 3/1999 | Coverdill et al. |
| 5,890,520 A | 4/1999 | Johnson, Jr. |
| 5,892,346 A | 4/1999 | Moroto et al. |
| 5,894,617 A | 4/1999 | Liou |
| 5,913,180 A | 6/1999 | Ryan |
| 5,919,239 A | 7/1999 | Fraker et al. |
| 5,922,037 A | 7/1999 | Potts |
| 5,923,572 A | 7/1999 | Pollock |
| 5,928,291 A | 7/1999 | Jenkins et al. |
| 5,933,844 A | 8/1999 | Young |
| 5,942,753 A | 8/1999 | Dell |
| 5,956,259 A | 9/1999 | Hartsell, Jr. et al. |
| 5,983,154 A | 11/1999 | Morisawa |
| 5,987,377 A | 11/1999 | Westerlage et al. |
| 5,995,895 A | 11/1999 | Watt et al. |
| 5,995,898 A | 11/1999 | Tuttle |
| 6,009,355 A | 12/1999 | Obradovich et al. |
| 6,009,363 A | 12/1999 | Beckert et al. |
| 6,016,457 A | 1/2000 | Toukura et al. |
| 6,016,795 A | 1/2000 | Ohki |
| 6,024,142 A | 2/2000 | Bates |
| 6,025,776 A | 2/2000 | Matsuura |
| 6,038,500 A | 3/2000 | Weiss |
| 6,043,661 A | 3/2000 | Gutierrez |
| 6,049,755 A | 4/2000 | Lou et al. |
| 6,054,950 A | 4/2000 | Fontana |
| 6,061,614 A | 5/2000 | Carrender et al. |
| 6,064,299 A | 5/2000 | Lesesky et al. |
| 6,070,118 A | 5/2000 | Ohta et al. |
| 6,070,156 A | 5/2000 | Hartsell, Jr. |

(56) References Cited

U.S. PATENT DOCUMENTS

| | | |
|---|---|---|
| 6,078,255 A | 6/2000 | Dividock et al. |
| 6,084,870 A | 7/2000 | Wooten et al. |
| 6,092,021 A | 7/2000 | Ehlbeck et al. |
| 6,107,915 A | 8/2000 | Reavell et al. |
| 6,107,917 A | 8/2000 | Carrender et al. |
| 6,112,152 A | 8/2000 | Tuttle |
| 6,127,947 A | 10/2000 | Uchida et al. |
| 6,128,551 A | 10/2000 | Davis et al. |
| 6,128,959 A | 10/2000 | McGovern et al. |
| 6,134,499 A | 10/2000 | Goode et al. |
| 6,169,938 B1 | 1/2001 | Hartsell, Jr. |
| 6,169,943 B1 | 1/2001 | Simon et al. |
| 6,199,099 B1 | 3/2001 | Gershman et al. |
| 6,202,008 B1 | 3/2001 | Beckert et al. |
| 6,208,948 B1 | 3/2001 | Klingler et al. |
| 6,236,911 B1 | 5/2001 | Kruger |
| 6,240,365 B1 | 5/2001 | Bunn |
| 6,253,129 B1 | 6/2001 | Jenkins et al. |
| 6,256,579 B1 | 7/2001 | Tanimoto |
| 6,259,358 B1 | 7/2001 | Fjordbotten |
| 6,263,273 B1 | 7/2001 | Henneken et al. |
| 6,263,276 B1 | 7/2001 | Yokoyama et al. |
| 6,278,928 B1 | 8/2001 | Aruga et al. |
| 6,278,936 B1 | 8/2001 | Jones |
| 6,285,953 B1 | 9/2001 | Harrison et al. |
| 6,295,492 B1 | 9/2001 | Lang et al. |
| 6,330,499 B1 | 12/2001 | Chou et al. |
| 6,339,745 B1 | 1/2002 | Novik |
| 6,362,730 B2 | 3/2002 | Razavi et al. |
| 6,370,454 B1 | 4/2002 | Moore |
| 6,374,176 B1 | 4/2002 | Schmier et al. |
| 6,396,413 B2 | 5/2002 | Hines et al. |
| 6,411,203 B1 | 6/2002 | Lesesky et al. |
| 6,411,888 B1 | 6/2002 | Weisman, II |
| 6,411,891 B1 | 6/2002 | Jones |
| 6,417,760 B1 | 7/2002 | Mabuchi et al. |
| 6,421,790 B1 | 7/2002 | Fruehling et al. |
| 6,438,471 B1 | 8/2002 | Katagishi et al. |
| 6,438,472 B1 | 8/2002 | Tano et al. |
| 6,450,411 B1 | 9/2002 | Rash et al. |
| 6,456,039 B1 | 9/2002 | Lauper et al. |
| 6,502,030 B2 | 12/2002 | Hilleary |
| 6,505,106 B1 | 1/2003 | Lawrence et al. |
| 6,507,810 B2 | 1/2003 | Razavi et al. |
| 6,529,723 B1 | 3/2003 | Bentley |
| 6,529,808 B1 | 3/2003 | Diem |
| 6,535,811 B1 | 3/2003 | Rowland et al. |
| 6,539,296 B2 | 3/2003 | Diaz et al. |
| 6,571,168 B1 | 5/2003 | Murphy et al. |
| 6,587,768 B2 | 7/2003 | Chene et al. |
| 6,594,579 B1 | 7/2003 | Lowrey et al. |
| 6,594,621 B1 | 7/2003 | Meeker |
| 6,597,973 B1 | 7/2003 | Barich et al. |
| 6,604,033 B1 | 8/2003 | Banet et al. |
| 6,608,554 B2 | 8/2003 | Lesesky et al. |
| 6,609,082 B2 | 8/2003 | Wagner |
| 6,611,740 B2 | 8/2003 | Lowrey et al. |
| 6,614,392 B2 | 9/2003 | Howard |
| 6,616,036 B2 | 9/2003 | Streicher et al. |
| 6,621,452 B2 | 9/2003 | Knockeart et al. |
| 6,636,790 B1 | 10/2003 | Lightner et al. |
| 6,664,897 B2 | 12/2003 | Pape et al. |
| 6,671,646 B2 | 12/2003 | Manegold et al. |
| 6,680,694 B1 | 1/2004 | Knockeart et al. |
| 6,708,113 B1 | 3/2004 | Von Gerlach et al. |
| 6,714,857 B2 | 3/2004 | Kapolka et al. |
| 6,714,859 B2 | 3/2004 | Jones |
| 6,727,818 B1 | 4/2004 | Wildman et al. |
| 6,732,031 B1 | 5/2004 | Lightner et al. |
| 6,732,032 B1 | 5/2004 | Banet et al. |
| 6,735,542 B1 | 5/2004 | Burgett et al. |
| 6,744,352 B2 | 6/2004 | Lesesky et al. |
| 6,748,318 B1 | 6/2004 | Jones |
| 6,754,183 B1 | 6/2004 | Razavi et al. |
| 6,757,606 B1 | 6/2004 | Gonring |
| 6,768,994 B1 | 7/2004 | Howard et al. |
| 6,795,761 B1 | 9/2004 | Lee et al. |
| 6,801,841 B2 | 10/2004 | Tabe |
| 6,801,901 B1 | 10/2004 | Ng |
| 6,804,606 B2 | 10/2004 | Jones |
| 6,804,626 B2 | 10/2004 | Manegold et al. |
| 6,816,762 B2 | 11/2004 | Hensey et al. |
| 6,834,259 B1 | 12/2004 | Markwitz et al. |
| 6,839,619 B2 | 1/2005 | Bellinger |
| 6,847,887 B1 | 1/2005 | Casino |
| 6,856,820 B1 | 2/2005 | Kolls |
| 6,856,897 B1 | 2/2005 | Phuyal et al. |
| 6,876,642 B1 | 4/2005 | Adams et al. |
| 6,879,894 B1 | 4/2005 | Lightner et al. |
| 6,880,390 B2 | 4/2005 | Emord |
| 6,894,617 B2 | 5/2005 | Richman |
| 6,899,151 B1 | 5/2005 | Latka et al. |
| 6,904,359 B2 | 6/2005 | Jones |
| 6,909,947 B2 | 6/2005 | Douros et al. |
| 6,924,750 B2 | 8/2005 | Flick |
| 6,928,348 B1 | 8/2005 | Lightner et al. |
| 6,946,953 B2 | 9/2005 | Lesesky et al. |
| 6,952,645 B1 | 10/2005 | Jones |
| 6,954,689 B2 | 10/2005 | Hanson et al. |
| 6,957,133 B1 | 10/2005 | Hunt et al. |
| 6,972,668 B2 | 12/2005 | Schauble |
| 6,980,093 B2 | 12/2005 | Oursler et al. |
| 6,988,033 B1 | 1/2006 | Lowrey et al. |
| 7,022,018 B2 | 4/2006 | Koga |
| 7,027,955 B2 | 4/2006 | Markwitz et al. |
| 7,035,733 B1 | 4/2006 | Alwar et al. |
| 7,048,185 B2 | 5/2006 | Hart |
| 7,068,301 B2 | 6/2006 | Thompson |
| 7,103,460 B1 | 9/2006 | Breed |
| 7,113,127 B1 | 9/2006 | Banet et al. |
| 7,117,121 B2 | 10/2006 | Brinton et al. |
| 7,129,852 B2 | 10/2006 | Aslund et al. |
| 7,155,199 B2 | 12/2006 | Zalewski et al. |
| 7,171,372 B2 | 1/2007 | Daniel et al. |
| 7,174,243 B1 | 2/2007 | Lightner et al. |
| 7,174,277 B2 | 2/2007 | Vock et al. |
| 7,177,750 B2 | 2/2007 | Schröder |
| 7,184,866 B2 | 2/2007 | Squires et al. |
| 7,202,801 B2 | 4/2007 | Chou |
| 7,225,065 B1 | 5/2007 | Hunt et al. |
| 7,228,211 B1 | 6/2007 | Lowrey et al. |
| 7,254,516 B2 | 8/2007 | Case, Jr. et al. |
| 7,343,252 B2 | 3/2008 | Wiens |
| 7,362,229 B2 | 4/2008 | Brinton et al. |
| 7,366,589 B2 | 4/2008 | Habermas |
| 7,424,414 B2 | 9/2008 | Craft |
| 7,447,574 B1 | 11/2008 | Washicko et al. |
| 7,477,968 B1 | 1/2009 | Lowrey et al. |
| 7,480,551 B1 | 1/2009 | Lowrey et al. |
| 7,523,159 B1 | 4/2009 | Williams et al. |
| 7,532,962 B1 | 5/2009 | Lowrey et al. |
| 7,532,963 B1 | 5/2009 | Lowrey et al. |
| 7,590,768 B2 | 9/2009 | Gormley |
| 7,596,437 B1 | 9/2009 | Hunt et al. |
| 7,604,169 B2 | 10/2009 | Demere |
| 7,627,546 B2 | 12/2009 | Moser et al. |
| 7,640,185 B1 | 12/2009 | Giordano et al. |
| 7,650,210 B2 | 1/2010 | Breed |
| 7,660,658 B2 | 2/2010 | Sheynblat |
| 7,672,756 B2 | 3/2010 | Breed |
| 7,672,763 B1 | 3/2010 | Hunt et al. |
| 7,692,552 B2 | 4/2010 | Harrington et al. |
| 7,774,123 B2 | 8/2010 | Schröder |
| 7,778,752 B1 | 8/2010 | Hunt et al. |
| 7,783,507 B2 | 8/2010 | Schick et al. |
| 7,831,368 B2 | 11/2010 | Schröder |
| 7,841,317 B2 | 11/2010 | Williams et al. |
| 7,913,664 B2 | 3/2011 | Williams et al. |
| 7,925,426 B2 | 4/2011 | Koebler et al. |
| 8,014,915 B2 | 9/2011 | Jeon et al. |
| 8,046,501 B2 | 10/2011 | Gormley |
| 8,090,598 B2 | 1/2012 | Bauer et al. |
| 8,140,265 B2 | 3/2012 | Grush |
| 8,140,358 B1 | 3/2012 | Ling et al. |

(56) References Cited

U.S. PATENT DOCUMENTS

| | | |
|---|---|---|
| 8,185,293 B2 | 5/2012 | Jiang et al. |
| 8,204,634 B2 | 6/2012 | Schwarz et al. |
| 8,219,796 B2 | 7/2012 | Weiberle et al. |
| 8,280,573 B2 | 10/2012 | Sudou et al. |
| 8,527,132 B2 | 9/2013 | Mineta |
| 8,560,996 B1 | 10/2013 | Brebner et al. |
| 8,577,703 B2 | 11/2013 | McClellan et al. |
| 8,604,920 B2 | 12/2013 | Armitage et al. |
| 8,849,501 B2 | 9/2014 | Cook et al. |
| 8,882,634 B2 | 11/2014 | Banker et al. |
| 8,914,184 B2 | 12/2014 | McQuade et al. |
| 8,918,229 B2 | 12/2014 | Hunt et al. |
| 8,924,138 B2 | 12/2014 | Chauncey et al. |
| 8,930,040 B2 | 1/2015 | Gompert et al. |
| 8,949,008 B2 | 2/2015 | Krengiel |
| 8,996,287 B2 | 3/2015 | Davidson et al. |
| 9,162,573 B2 | 10/2015 | Grajkowski et al. |
| 9,170,913 B2 | 10/2015 | Hunt et al. |
| 9,229,906 B2 | 1/2016 | McQuade et al. |
| 9,358,986 B2 | 6/2016 | Hunt |
| 9,393,954 B2 | 7/2016 | Gibson et al. |
| 9,447,747 B2 | 9/2016 | Gibson et al. |
| 9,527,515 B2 | 12/2016 | Hunt et al. |
| 9,631,528 B2 | 4/2017 | Bradley et al. |
| 9,747,254 B2 | 8/2017 | McQuade et al. |
| 2001/0047283 A1 | 11/2001 | Melick et al. |
| 2001/0053983 A1 | 12/2001 | Reichwein et al. |
| 2002/0016655 A1 | 2/2002 | Joao |
| 2002/0022979 A1 | 2/2002 | Whipp et al. |
| 2002/0107833 A1 | 8/2002 | Kerkinni |
| 2002/0107873 A1 | 8/2002 | Winkler et al. |
| 2002/0111725 A1 | 8/2002 | Burge |
| 2002/0116122 A1 | 8/2002 | Satonaka |
| 2002/0132699 A1 | 9/2002 | Bellinger |
| 2002/0133275 A1 | 9/2002 | Thibault |
| 2002/0150050 A1 | 10/2002 | Nathanson |
| 2002/0165669 A1 | 11/2002 | Pinto et al. |
| 2002/0178147 A1 | 11/2002 | Arroyo et al. |
| 2003/0030550 A1 | 2/2003 | Talbot |
| 2003/0033071 A1 | 2/2003 | Kawasaki |
| 2003/0036823 A1 | 2/2003 | Mahvi |
| 2003/0060966 A1 | 3/2003 | MacPhail et al. |
| 2003/0120745 A1 | 6/2003 | Katagishi et al. |
| 2003/0132699 A1 | 7/2003 | Yamaguchi et al. |
| 2003/0146854 A1 | 8/2003 | Jones |
| 2003/0182033 A1 | 9/2003 | Underdahl et al. |
| 2003/0195696 A1 | 10/2003 | Jones |
| 2003/0195697 A1 | 10/2003 | Jones |
| 2003/0195698 A1 | 10/2003 | Jones |
| 2003/0195699 A1 | 10/2003 | Jones |
| 2003/0216847 A1 | 11/2003 | Bellinger |
| 2004/0006421 A1 | 1/2004 | Yanase |
| 2004/0039504 A1 | 2/2004 | Coffee et al. |
| 2004/0044452 A1 | 3/2004 | Bauer et al. |
| 2004/0054470 A1 | 3/2004 | Farine et al. |
| 2004/0133336 A1 | 7/2004 | Fosseen |
| 2004/0230346 A1 | 11/2004 | Brooks et al. |
| 2004/0236596 A1 | 11/2004 | Chowdhary et al. |
| 2004/0243368 A1 | 12/2004 | Hiemer et al. |
| 2004/0249558 A1 | 12/2004 | Meaney |
| 2005/0010479 A1 | 1/2005 | Hannigan et al. |
| 2005/0021222 A1 | 1/2005 | Minami et al. |
| 2005/0072384 A1 | 4/2005 | Hadley et al. |
| 2005/0107946 A1 | 5/2005 | Shimizu et al. |
| 2005/0131625 A1 | 6/2005 | Birger et al. |
| 2005/0206534 A1 | 9/2005 | Yamane et al. |
| 2005/0209775 A1 | 9/2005 | Entenmann |
| 2005/0273250 A1 | 12/2005 | Hamilton et al. |
| 2006/0041337 A1 | 2/2006 | Augsburger et al. |
| 2006/0047381 A1 | 3/2006 | Nguyen |
| 2006/0047384 A1 | 3/2006 | Robinson et al. |
| 2006/0106510 A1 | 5/2006 | Heffington |
| 2006/0111868 A1 | 5/2006 | Beshears et al. |
| 2006/0232406 A1 | 10/2006 | Filibeck |
| 2006/0246918 A1 | 11/2006 | Fok et al. |
| 2007/0001831 A1 | 1/2007 | Raz et al. |
| 2007/0038343 A1 | 2/2007 | Larschan et al. |
| 2007/0050193 A1 | 3/2007 | Larson |
| 2007/0069947 A1 | 3/2007 | Banet et al. |
| 2007/0083314 A1 | 4/2007 | Corigliano et al. |
| 2007/0143002 A1 | 6/2007 | Crowell et al. |
| 2007/0149184 A1 | 6/2007 | Viegers et al. |
| 2007/0156337 A1 | 7/2007 | Yanni |
| 2007/0168125 A1 | 7/2007 | Petrik |
| 2007/0174683 A1 | 7/2007 | Gehring et al. |
| 2007/0179709 A1 | 8/2007 | Doyle |
| 2007/0192012 A1 | 8/2007 | Letang |
| 2007/0256481 A1 | 11/2007 | Nishiyama et al. |
| 2007/0293369 A1 | 12/2007 | Hornbrook et al. |
| 2008/0027591 A1 | 1/2008 | Lenser et al. |
| 2008/0077299 A1 | 3/2008 | Arshad et al. |
| 2008/0086241 A1 | 4/2008 | Phillips et al. |
| 2008/0109122 A1 | 5/2008 | Ferguson et al. |
| 2008/0121443 A1 | 5/2008 | Clark et al. |
| 2008/0154489 A1 | 6/2008 | Kaneda et al. |
| 2008/0154712 A1 | 6/2008 | Wellman |
| 2008/0167767 A1 | 7/2008 | Brooks et al. |
| 2008/0243389 A1 | 10/2008 | Inoue et al. |
| 2008/0262646 A1 | 10/2008 | Breed |
| 2008/0269974 A1 | 10/2008 | Schwarz et al. |
| 2008/0319602 A1 | 12/2008 | McClellan et al. |
| 2008/0319665 A1 | 12/2008 | Berkobin et al. |
| 2009/0037033 A1 | 2/2009 | Phillips et al. |
| 2009/0069999 A1 | 3/2009 | Bos |
| 2009/0093941 A1 | 4/2009 | Drazich |
| 2009/0126691 A1 | 5/2009 | Bach |
| 2009/0143923 A1 | 6/2009 | Breed |
| 2009/0156310 A1 | 6/2009 | Fargo |
| 2009/0157267 A1 | 6/2009 | Shin et al. |
| 2009/0160675 A1 | 6/2009 | Piccinini et al. |
| 2009/0164081 A1 | 6/2009 | Meloche et al. |
| 2009/0177350 A1 | 7/2009 | Williams et al. |
| 2009/0186325 A1 | 7/2009 | Kumar |
| 2009/0222200 A1 | 9/2009 | Link, II et al. |
| 2009/0240391 A1 | 9/2009 | Duddle et al. |
| 2009/0254259 A1 | 10/2009 | The |
| 2010/0005280 A1 | 1/2010 | Wagner et al. |
| 2010/0009696 A1 | 1/2010 | Fok et al. |
| 2010/0017236 A1 | 1/2010 | Duddle et al. |
| 2010/0082238 A1 | 4/2010 | Nakamura et al. |
| 2010/0088127 A1 | 4/2010 | Betancourt et al. |
| 2010/0114404 A1 | 5/2010 | Donnelly |
| 2010/0121539 A1 | 5/2010 | Price et al. |
| 2010/0145550 A1 | 6/2010 | Ross-Martin |
| 2010/0145600 A1 | 6/2010 | Son et al. |
| 2010/0152941 A1 | 6/2010 | Skaff et al. |
| 2010/0160013 A1 | 6/2010 | Sanders |
| 2010/0161172 A1 | 6/2010 | Bjelkstål |
| 2010/0191403 A1 | 7/2010 | Krause |
| 2010/0198466 A1 | 8/2010 | Eklund et al. |
| 2010/0204882 A1 | 8/2010 | Giovaresco et al. |
| 2010/0207760 A1 | 8/2010 | Stomski |
| 2010/0209884 A1 | 8/2010 | Lin et al. |
| 2010/0209890 A1 | 8/2010 | Huang et al. |
| 2010/0209891 A1 | 8/2010 | Lin et al. |
| 2010/0211278 A1 | 8/2010 | Craig et al. |
| 2010/0250056 A1 | 9/2010 | Perkins |
| 2010/0265034 A1 | 10/2010 | Cap et al. |
| 2010/0305819 A1 | 12/2010 | Pihlajamaki |
| 2010/0324955 A1 | 12/2010 | Rinehart et al. |
| 2011/0098898 A1 | 4/2011 | Stählin et al. |
| 2011/0106374 A1 | 5/2011 | Margol et al. |
| 2011/0106388 A1 | 5/2011 | Boeckenhoff et al. |
| 2011/0112739 A1 | 5/2011 | O'Dea et al. |
| 2011/0137773 A1 | 6/2011 | Davis, III et al. |
| 2011/0148618 A1 | 6/2011 | Harumoto et al. |
| 2011/0161116 A1 | 6/2011 | Peak et al. |
| 2011/0172895 A1 | 7/2011 | Fukumoto et al. |
| 2011/0178684 A1 | 7/2011 | Umemoto et al. |
| 2011/0184642 A1 | 7/2011 | Rotz et al. |
| 2011/0276209 A1 | 11/2011 | Suganuma et al. |
| 2011/0279255 A1 | 11/2011 | Miyoshi |
| 2011/0307166 A1 | 12/2011 | Hiestermann et al. |
| 2011/0313647 A1 | 12/2011 | Koebler et al. |

(56) References Cited

U.S. PATENT DOCUMENTS

| | | | |
|---|---|---|---|
| 2012/0041638 A1 | 2/2012 | Johnson et al. |
| 2012/0083958 A1 | 4/2012 | Ballard |
| 2012/0087771 A1 | 4/2012 | Wenzel |
| 2012/0136539 A1 | 5/2012 | Bryant et al. |
| 2012/0143484 A1 | 6/2012 | Sawada |
| 2012/0191269 A1 | 7/2012 | Chen et al. |
| 2012/0221216 A1 | 8/2012 | Chauncey et al. |
| 2012/0221234 A1 | 8/2012 | Sujan et al. |
| 2012/0226391 A1 | 9/2012 | Fryer et al. |
| 2012/0239279 A1 | 9/2012 | Stuart et al. |
| 2012/0239462 A1 | 9/2012 | Pursell et al. |
| 2012/0253744 A1 | 10/2012 | Schmidt |
| 2012/0256770 A1 | 10/2012 | Mitchell |
| 2012/0268587 A1 | 10/2012 | Robbins et al. |
| 2012/0277949 A1 | 11/2012 | Ghimire et al. |
| 2012/0296532 A1 | 11/2012 | Murakami et al. |
| 2012/0296569 A1 | 11/2012 | Adams |
| 2012/0323402 A1 | 12/2012 | Murakami |
| 2013/0006469 A1 | 1/2013 | Green et al. |
| 2013/0030660 A1 | 1/2013 | Fujimoto |
| 2013/0030667 A1 | 1/2013 | Fujimoto et al. |
| 2013/0046559 A1 | 2/2013 | Coleman et al. |
| 2013/0061044 A1 | 3/2013 | Pinkus et al. |
| 2013/0079950 A1 | 3/2013 | You |
| 2013/0138288 A1 | 5/2013 | Nickolaou et al. |
| 2013/0158838 A1 | 6/2013 | Yorke et al. |
| 2013/0164712 A1 | 6/2013 | Hunt et al. |
| 2013/0164713 A1 | 6/2013 | Hunt et al. |
| 2013/0164715 A1 | 6/2013 | Hunt et al. |
| 2013/0166170 A1 | 6/2013 | Hunt et al. |
| 2013/0184965 A1 | 7/2013 | Hunt et al. |
| 2013/0209968 A1 | 8/2013 | Miller et al. |
| 2013/0238182 A1 | 9/2013 | Osagawa et al. |
| 2013/0261939 A1 | 10/2013 | McQuade et al. |
| 2013/0261942 A1 | 10/2013 | McQuade et al. |
| 2013/0274955 A1 | 10/2013 | Rosenbaum |
| 2013/0345914 A1 | 12/2013 | Love et al. |
| 2013/0345927 A1 | 12/2013 | Cook et al. |
| 2014/0012634 A1 | 1/2014 | Pearlman et al. |
| 2014/0195106 A1 | 7/2014 | McQuade et al. |
| 2014/0257943 A1 | 9/2014 | Nerayoff et al. |
| 2014/0309844 A1 | 10/2014 | Breed |
| 2014/0309849 A1 | 10/2014 | Ricci |
| 2014/0350777 A1 | 11/2014 | Kawai et al. |
| 2014/0365070 A1 | 12/2014 | Yano et al. |
| 2015/0291176 A1 | 10/2015 | Jeong et al. |
| 2017/0066453 A1 | 3/2017 | Hunt |
| 2017/0067385 A1 | 3/2017 | Hunt |
| 2017/0084091 A1 | 3/2017 | McQuade et al. |
| 2017/0322907 A1 | 11/2017 | McQuade et al. |
| 2017/0329742 A1 | 11/2017 | McQuade et al. |

FOREIGN PATENT DOCUMENTS

| | | |
|---|---|---|
| CA | 2 388 572 A1 | 5/2001 |
| EP | 0 755 039 A2 | 1/1997 |
| EP | 0 814 447 A1 | 12/1997 |
| EP | 0 926 020 A2 | 6/1999 |
| EP | 1 067 498 A1 | 1/2001 |
| EP | 1 271 374 A1 | 1/2003 |
| EP | 1 005 627 B1 | 10/2003 |
| EP | 1 027 792 B1 | 1/2004 |
| EP | 2 116 968 A1 | 11/2009 |
| JP | 2001-280985 A | 10/2001 |
| WO | 97/26750 A1 | 7/1997 |
| WO | 98/03952 A1 | 1/1998 |
| WO | 98/30920 A2 | 7/1998 |
| WO | 03/023550 A2 | 3/2003 |
| WO | 2007/092711 A2 | 8/2007 |

OTHER PUBLICATIONS

"ObjectFX Integrates TrackingAdvisor with Qualcomm's FleetAdvisor System; Updated Version Offers Benefit of Visual Display of Vehicles and Routes to Improve Fleet Productivity," Business Wire, Oct. 27, 2003, URL=https://www.thefreelibrary.com/_/print/PrintArticle.aspx?id=109283193, download date Aug. 28, 2017, 3 pages.

"Private fleets moving to wireless communications," Drivers, May 1, 1997, URL=https://web.archive.org/web/20060511114359/driversmag.com/ar/fleet_private_fleets_moving/index.html, download date Aug. 28, 2017, 4 pages.

Albright, "Indiana embarks on ambitious RFID roll out," Frontline Solutions, May 20, 2002, URL=https://web.archive.org/web/20021102141244/http://www.frontlinetoday.com/frontline/article/articleDetail.jsp?id=19358, download date Aug. 28, 2017, 3 pages.

Anonymous, "Transit agency builds GIS to plan bus routes", *American City & Country* 118(4):14-16, Apr. 1, 2003. (4 pages).

Banks et al., "DATATRAK Automatic Vehicle Location and Position Reporting System," *Vehicle Navigation and Information Systems Conference*, Toronto, Canada, Sep. 11-13, 1989, pp. 214-218.

Banks, "Integrated Automatic Vehicle Location and Position Reporting System," $2^{nd}$ *International Conference on Road Traffic Monitoring*, London, United Kingdom, Feb. 7-9, 1989, pp. 195-199.

Black, "OBD II Up Close," *Motor*:28-34, Jul. 1998. (6 pages).

Child Checkmate Systems Inc., "What is the Child Check-Mate Safety System," URLs=http://www.childcheckmate.com/what.html, http://www.childcheckmate.com/overview.html, http://www.childcheckmate.com/how.html, download date Apr. 7, 2004, 5 pages.

Detex, "Detex Announces the Latest Innovation in Guard Tour Verification Technology," Jan. 1, 2003, URL=https://web.archive.org/web/20031208082505/http://www.detex.com/NewsAction.jspa?id=3 , download date Aug. 28, 2017, 1 page.

Dwyer et al., "Analysis of the Performance and Emissions of Different Bus Technologies on the City of San Francisco," *SAE Commercial Vehicle Engineering Congress and Exhibition*, Rosemont, Illinois, USA, Oct. 26-28, 2004. (Abstract only) (2 pages).

FleeTTrakkeR, "D.O.T. Driver Vehicle Inspection Reports on your wireless phone!," ReporTTrakkeR, URL=http://www.fleettrakker.com/web/index.jsp, download date Mar. 12, 2004, 3 pages.

GCS General Control Systems, "The Data Acquisition Unit Escorte," Nov. 20, 2001, URL=http://www.gcs.at/eng/produkte/hw/escorte.htm, download date Apr. 21, 2005, 4 pages.

GCS General Control Systems, "The PenMaster," and "The PSION Workabout," Nov. 20, 2001, URL=http://www.gcs.at/eng/produkte/hw/penmaster.htm, download date Apr. 5, 2007, 3 pages.

GCS General Control Systems, News, Dec. 11, 2002, URL=http://www.gcs.at/eng/news/allgemein.htm, download date Apr. 21, 2005, 2 pages.

Ghilardelli et al., "Path Generation Using $\eta^4$-Splines for a Truck and Trailer Vehicle," *IEEE Transactions on Automation Science and Engineering* 11(1):187-203, 2014.

Guensler et al., "Development of a Comprehensive Vehicle Instrumentation Package for Monitoring Individual Tripmaking Behavior," Technical Specifications and Analysis, Georgia Institute of Technology, School of Civil and Environmental Engineering, Atlanta, Georgia, USA, Feb. 1999, 31 pages.

Jenkins et al., "Real-Time Vehicle Performance Monitoring Using Wireless Networking," *Proceedings of the 3rd IASTED International Conference on Communications, Internet and Information Technology*, St. Thomas, US Virgin Islands, Nov. 22-24, 2004, pp. 375-380.

Kurtz, "Indiana's E-Government: A Story Behind Its Ranking," *INContext* 4(1):6-8, 2003.

Kwon, "Networking Technologies of In-Vehicle," Seoul National University, School of Electrical Engineering, Seoul, South Korea, Mar. 8, 2000, 44 pages.

Leavitt, "The Convergence Zone," FleetOwner, Jun. 1, 1998, URL=http://www.driversmag.com/ar/fleet_convergence_zone/index.html, download date Aug. 24, 2010, 4 pages.

MIRAS, "About SPS Technologies," as archived on May 7, 1999, URL=http://replay.waybackmachine.org/19990507195047/http://www.miras.com/html/about_sps_technologies.html, download date Sep. 29, 2010, 1 page.

(56) References Cited

OTHER PUBLICATIONS

MIRAS, "How MIRAS Works," as archived on Apr. 29, 1999, URL=http://replay.waybackmachine.org/19990429144910/http://www.miras.com/html/products.html, download date Sep. 29, 2010, 1 page.

MIRAS, "MIRAS Unit," as archived on May 4, 1999, URL=http://replay.waybackmachine.org/19990504052250/http://www.miras.com/html/1000unit.html, download date Sep. 29, 2010, 1 page.

MIRAS, "Monitoring Vehicle Functions," as archived on Apr. 27, 1999, URL=http://replay.waybackmachine.org/19990427152518/http://www.miras.com/html/monitoring.html, download date Sep. 29, 2010, 1 page.

MIRAS, "Remote Control," as archived on Apr. 29, 1999, URL= http://replay.waybackmachine.org/19990429145717/http://www.miras.com/html/remote_control.html, download date Sep. 29, 2010, 1 page.

MIRAS, "Tracking & Monitoring Software," as archived on Apr. 29, 1999, URL=http://replay.waybackmachine.org/19990429160322/http://www.miras.com/html/software.html, download date Sep. 29, 2010, 1 page.

MIRAS, MIRAS 4.0 Screenshot, as archived on May 7, 1999, URL=http://replay.waybackmachine.org/19990507205618/http://www.miras.com/html/largescreen.html, download date Sep. 29, 2010, 1 page.

"MIRAS GPS vehicle tracking using the Internet," Business Wire, Nov. 22, 1996, URL=https://www.thefreelibrary.com/_/print/PrintArticle.aspx?id=18878231, download date Aug. 28, 2017, 2 page.

Pan et al., "Simulation-Based Optimization for Split Delivery Vehicle Routing Problem: A Report of Ongoing Study," *Proceedings of the 2013 Winter Simulation Conference*, Washington D.C., USA, Dec. 8-11, 2013, pp. 1089-1096.

Papadoglou et al., "Short message service link for automatic vehicle location reporting," *Electronics Letters* 35(11):876-877, 1999.

Quaan et al., Guard Tour Systems, post dates Sep. 16, 2003, Oct. 3, 2003, and Sep. 4, 2004, URL=http://www.securitymanagement.com/ubb/Forum30/HTML/000066.html, download date Mar. 8, 2005, 1 page.

Rehman et al., "Characterisation of System Performance of GPS Antennas in Mobile Terminals Including Environmental Effects," $3^{rd}$ *European Conference on Antennas and Propagation*, Berlin, Germany, Mar. 23-27, 2009, pp. 1832-1836.

Senger, "Inside RF/ID: Carving a Niche Beyond Asset Tracking," *Business Solutions*, Feb. 1, 1999, 3 pages.

Sterzbach et al., "A Mobile Vehicle On-Board Computing and Communication System," *Computers & Graphics* 20(4):659-667, 1996.

The Gale Group, "Tracking out of route: software helps fleets compare planned routes to actual miles.(Technology)," *Commercial Carrier Journal* 162(10):S46, 2005. (4 pages).

TISCOR, "Inspection Manager 6.0," Product User Guide, 2004, 73 pages.

TISCOR, "Inspection Manager: An Introduction," Sep. 27, 2004, 19 pages.

Tsakiri et al., "Urban Fleet Monitoring with GPS and GLONASS," *The Journal of Navigation* 51(3):382-393, 1998. (Abstract only) (2 pages).

Tuttle, "Digital RF/ID Enhances GPS," *Proceedings of the $2^{nd}$ Annual Wireless Symposium*, Santa Clara, California, USA, Feb. 15-18, 1994, pp. 406-411.

Want, "RFID: A Key to Automating Everything," *Scientific American* 290(1):56-65, 2004.

Zujkowski, "Savi Technology, Inc.: Savi Security and Productivity Systems," Remarks, *ATA Security Forum*, Chicago, Illinois, USA, May 15, 2002, 21 pages.

New Way – Look Beyond MPG

- Driver 1
- 6.49 MPG
  - Heavy Load
  - Through the mountains
  - Driver Efficiency 97.7%
    - 84.9% Cruise
    - 61.3 MPH avg OverSpeed
    - 2% outside Sweetzone
    - 1 hour Idle
- Potential 6.54 MPG

- Lost 0.05 MPG ($8.44)

- Driver 2
- 7.14 MPG
  - Light Load
  - Across the flatlands
  - Driver Efficiency 66.9%
    - 0% Cruise
    - 63.4 MPH avg OverSpeed
    - 53% outside Sweetzone
    - 1 hour Idle
- Potential 7.86 MPG

- Lost 0.72 MPG ($114.77)

*FIG. 11*

Analysis done on "Cloud" servers

- transRatio = (60*RPM)/(Rear Axle Ratio * Tire Revolutions Per Mile * MPH)
    o RPM = Vehicle Revolutions Per Minute pulled from vehicle ECM
    o MPH = Vehicle Miles Per Hour pulled from vehicle ECM
    o RPM * 60 = Revolution Per Hour (RPH)
    o Rear Axle Ratio = Customer will have to supply this Ratio per vehicle
    o Tire Revolutions Per Mile = Customer must provide, part of tire specs
- Example 1 transRatio = 0.801 = (60*1350)/(3.55*518*55)
    o Vehicle at 1350 RPM and 55 MPH
- Example 2 transRatio = 0.627 = (60*1250)/(3.55*518*65)
    o Vehicle at 1250 RPM and 65 MPH
- TransRatio is compared with customer provided transmission ratios
    o Example Gear Ratio Table Below

| gear position | transmission ratio |
|---|---|
| L | 12.31 |
| 1 | 8.64 |
| 2 | 6.11 |
| 3 | 4.43 |
| 4 | 3.23 |
| 5 | 2.32 |
| 6 | 1.95 |
| 7 | 1.62 |
| 8 | 1.38 |
| 9 | 1.17 |
| 10 | 1.00 |
| 11 | 0.86 |
| 12 | 0.73 | o Example 1 transRatio = .801 = Gear 11 (1350 RPM, 55 MPH)
    o Example 2 transRatio = .627 = Gear 12 (1250 RPM, 65 MPH)
- Distance Travelled between GPS points (odometer delta) while vehicle is in top gear is recorded as top gear distance
- Top Gear % = Top Gear Distance / Total Distance travelled Information Presented to user in a web user interface

- Show map of vehicle path (GPS points)
- Display % travelled in top Gear
- Area in Top Gear colored Red
- Area travelled in lower gear colored blue

*FIG. 16B*

| Asset No. | Distance (mi) | Fuel (g) | MPG | Moving MPG | Potential MPG | Moving Pot. MPG | Driver Efficient | $/mi |
|---|---|---|---|---|---|---|---|---|
| 4798 | 560.0 | 78.1 | 7.17 | 7.18 | 7.70 | 7.71 | 77.01% | 0.0385 |
| 4375 | 608.5 | 74.6 | 8.15 | 8.30 | 8.75 | 8.91 | 77.43% | 0.0332 |
| 2899 | 555.5 | 75.4 | 7.36 | 7.48 | 7.89 | 8.02 | 77.92% | 0.0360 |
| 7142 | 613.1 | 74.2 | 8.26 | 8.27 | 8.82 | 8.84 | 78.57% | 0.0310 |
| 4803 | 300.0 | 54.4 | 5.51 | 6.09 | 5.88 | 6.54 | 79.39% | 0.0449 |
| 2870 | 393.4 | 47.6 | 8.27 | 8.27 | 8.81 | 8.81 | 79.50% | 0.0298 |
| 2943 | 313.7 | 40.0 | 7.84 | 7.94 | 8.35 | 8.47 | 79.59% | 0.0313 |
| 7135 | 645.9 | 79.0 | 8.18 | 8.21 | 8.71 | 8.74 | 79.77% | 0.0297 |
| 2917 | 1,114.5 | 150.2 | 7.42 | 7.43 | 7.90 | 7.91 | 79.94% | 0.0324 |
| 2802 | 647.7 | 86.4 | 7.50 | 7.50 | 7.97 | 7.97 | 80.33% | 0.0315 |
| 2938 | 623.2 | 76.2 | 8.18 | 8.18 | 8.69 | 8.69 | 80.36% | 0.0288 |
| 4760 | 291.1 | 36.6 | 7.96 | 8.01 | 8.43 | 8.49 | 81.19% | 0.0284 |
| 2949 | 642.5 | 85.9 | 7.48 | 7.51 | 7.92 | 7.95 | 81.49% | 0.0297 |
| 3385 | 1,213.9 | 142.5 | 8.52 | 8.54 | 9.02 | 9.04 | 81.56% | 0.0260 |

*FIG. 17A*

| Total Loss | AvgRPM | Top Gear | Total Cruise | Achievable Cru | Outside Sweet | Idle Fuel (g) | Idle Minutes |
|---|---|---|---|---|---|---|---|
| $21.54 | 1327 | 91.14% | 0.0% | 0.0% | 48.31% | 0.07 | 6.0 |
| $20.21 | 1376 | 98.41% | 82.6% | 85.6% | 78.09% | 1.28 | 109.4 |
| $19.98 | 1351 | 93.29% | 58.7% | 64.3% | 71.77% | 1.21 | 103.4 |
| $19.00 | 1352 | 95.32% | 74.6% | 79.9% | 78.44% | 0.09 | 7.8 |
| $13.46 | 1341 | 94.89% | 0.0% | 0.0% | 45.07% | 5.19 | 443.6 |
| $11.76 | 1352 | 99.27% | 90.6% | 91.8% | 79.42% | 0.00 | 0.0 |
| $9.80 | 1379 | 97.20% | 76.8% | 79.3% | 79.14% | 0.52 | 44.5 |
| $19.18 | 1358 | 96.50% | 82.7% | 86.1% | 79.07% | 0.27 | 23.3 |
| $36.16 | 1353 | 92.03% | 55.8% | 62.1% | 63.09% | 0.20 | 16.9 |
| $20.39 | 1363 | 95.97% | 66.0% | 69.8% | 69.87% | 0.06 | 5.4 |
| $17.96 | 1373 | 98.44% | 73.6% | 75.4% | 75.27% | 0.00 | 0.0 |
| $8.26 | 1360 | 87.25% | 43.3% | 49.7% | 57.78% | 0.23 | 19.5 |
| $19.07 | 1376 | 95.28% | 89.5% | 94.4% | 74.84% | 0.31 | 26.3 |
| $31.54 | 1367 | 98.83% | 89.7% | 91.8% | 74.85% | 0.36 | 30.5 |

*FIG. 17B*

USING TELEMATICS DATA INCLUDING POSITION DATA AND VEHICLE ANALYTICS TO TRAIN DRIVERS TO IMPROVE EFFICIENCY OF VEHICLE USE

RELATED APPLICATIONS

This application is a continuation of Ser. No. 14/214,008, filed on Mar. 14, 2014, and now pending. Ser. No. 14/214,008 is based on two prior copending provisional applications, Ser. No. 61/800,726 and Ser. No. 61/802,191, each filed on Mar. 15, 2013, the benefit of the filing dates of which are hereby claimed under 35 U.S.C. § 119(e). Ser. No. 14/214,008 is also a continuation-in-part of two prior co-pending application Ser. No. 13/725,128 and Ser. No. 13/725,886, both of which were filed on Dec. 21, 2012, and each of which is based on prior copending provisional application Ser. No. 61/580,197, filed on Dec. 24, 2011, the benefits of the filing dates of which are hereby claimed under 35 U.S.C. § 119(e) and 35 U.S.C. § 120. Ser. No. 14/214,008 is also a continuation-in-part of the following prior co-pending applications: Ser. No. 13/719,208; Ser. No. 13/719,211; and Ser. No. 13/719,218, each of which were filed on Dec. 18, 2012, and each of which is based on prior copending provisional application Ser. No. 61/580,190, filed on Dec. 23, 2011, the benefits of the filing dates of which are hereby claimed under 35 U.S.C. § 119(e) and 35 U.S.C. § 120. Ser. No. 14/214,008 is also a continuation-in-part of prior co-pending applications: Ser. No. 13/725,183 and Ser. No. 13/725,266, each of which were filed on Dec. 21, 2012, and each of which is based on prior copending provisional application Ser. No. 61/580,190, filed on Dec. 23, 2011, the benefits of the filing dates of which are hereby claimed under 35 U.S.C. § 119(e) and 35 U.S.C. § 120; Ser. No. 14/214,008 is a continuation-in-part of Ser. No. 12/836,487, filed on Jul. 14, 2010, which is a continuation-in-part of prior co-pending application Ser. No. 12/724,232, filed on Mar. 15, 2010, the benefit of the filing date of which is hereby claimed under 35 U.S.C. § 120; Ser. No. 12/724,232 is a continuation-in-part of U.S. patent application Ser. No. 11/675,502, filed on Feb. 15, 2007, the benefit of the filing date of which is hereby claimed under 35 U.S.C. § 120; Ser. No. 11/675,502 is a continuation-in-part of U.S. patent application Ser. No. 11/425,222, filed on Jun. 20, 2006, the benefit of the filing date of which is hereby claimed under 35 U.S.C. § 120.

BACKGROUND

As the cost of sensors, communications systems and navigational systems has dropped, operators of commercial and fleet vehicles now have the ability to collect a tremendous amount of data about the vehicles that they operate, including how the vehicles are being driven by the drivers operating such vehicles.

Unfortunately, simply collecting such data does not automatically translate into cost savings. It would be desirable to provide such fleet operators with additional tools in order to derive a benefit from the wealth of data that can be collected. Preferably, such tools can be used to provide feedback to drivers to enable the fleet operator to encourage driving habits leading to cost savings. Such a tool might thus be used to develop objective criteria that could be used encourage and provide incentives to drivers to improve their performance in operating the vehicles in a fleet.

SUMMARY

One aspect of the novel concepts presented herein is a method of providing feedback regarding driver performance based on empirical data collected during vehicle operation. In at least one embodiment, position and other vehicle performance data is collected at the vehicle and wirelessly conveyed to a remote computing site, where the data is analyzed and a driver efficiency score is generated. In general, GPS data and other vehicle performance data is collected. In at least some embodiments, the data will be obtained from a vehicle data bus or vehicle controller. In particularly preferred (but not limiting) embodiments, fuel injector data is used to acquire fuel use data every time a GPS data point is reported, enabling vehicle fuel use to be analyzed over very small distances, particularly where GPS data is reported frequently (ranging from 18 seconds to about 5 minutes in an exemplary but not limiting embodiment).

In reference to the description and the claims that follow, driver metrics are analyzed and reported on a per trip basis. A trip can be defined as a key on event to key off event. Multiple key on/key off events for a single day can be combined and reported as a single trip.

In at least one embodiment, the driver efficiency score is based on defining at least one driver performance metric, collecting data related to the driver performance metric during the driver's operation of a vehicle, determining how often the driver's deviated from an optimal standard for that driver performance metric, assuming the driver had a starting efficiency score of 100%, and then reducing the efficiency score based on how often the driver's deviated from the optimal standard for that driver performance metric, to express the result as an efficiency score of 100% or less (100% would be possible if the driver never varied from the optimal performance metric). In a related embodiment, the efficiency score for a specific trip, the total mileage driven for a specific trip, and an average cost of fuel are used to report a loss in dollars due to an efficiency score of less than 100%.

In at least one embodiment, the driver efficiency score is based at least in part on how often the driver deviated from an optimal RPM range (a sweet zone) for the vehicle being operated.

In at least one embodiment, the driver efficiency score is based at least in part on how often the driver operated a vehicle at highway speeds without using cruise control.

In at least one embodiment, the driver efficiency score is based at least in part on how often the driver operated a vehicle at highway speeds in excess of a predetermined maximum speed.

In at least one embodiment, the driver efficiency score is based at least in part on how often the driver operated a vehicle at highway speeds in any gear other than a top gear.

In at least one embodiment, the driver efficiency score is based at least in part on how often the driver allowed the vehicle to idle longer than a predetermined allowable idle time.

In at least one embodiment, the driver efficiency score is based on a combination of how often the driver deviated from an optimal RPM range (a sweet zone) and did not use cruise control at highway speeds.

In at least one embodiment, the driver efficiency score is based on a combination of how often the driver deviated from an optimal RPM range (a sweet zone), did not use cruise control at highway speeds, and exceeded a predetermined speed.

In at least one embodiment, the driver efficiency score is based on a combination of how often the driver did not use cruise control at highway speeds, and exceeded a predetermined speed.

In at least one embodiment, the driver efficiency score is visually presented on a graphical user interface (GUI) that simultaneously reports the driver's efficiency percentage score and lost dollars. In a related embodiment the GUI is a webpage. In a related embodiment the webpage also simultaneously displays the average RPM for the trip. In a related embodiment the webpage also simultaneously displays the amount of time at highway speeds the vehicle was in top gear, as a percentage for the trip. In a related embodiment the webpage also simultaneously displays the amount of time at highway speeds the vehicle was operating under cruise control, as a percentage for the trip. In a related embodiment the webpage also simultaneously displays the amount of time the vehicle was operating in an optimal RPM range, as a percentage for the trip. In a related embodiment the webpage also simultaneously displays the total miles for the trip. In a related embodiment the webpage also simultaneously displays the amount of fuel used for the trip. In a related embodiment the webpage includes all of the preceding elements noted in this paragraph. In a related embodiment the webpage also simultaneously displays the amount of time the vehicle was allowed to idle. In a related embodiment the webpage also simultaneously displays the amount of fuel the vehicle consumed while idling.

In at least one embodiment, the driver efficiency score is visually presented on a graphical user interface (GUI) that simultaneously reports the driver's overall efficiency percentage score, the driver's efficiency score based on use of an optimal RPM range, the driver's efficiency score based on use of cruise control at freeway speeds, and lost dollars.

In at least one embodiment, the driver efficiency score is visually presented on a graphical user interface (GUI) that simultaneously reports the driver's efficiency score based on use of an optimal RPM range and lost dollars.

In at least one embodiment, the driver efficiency score is visually presented on a graphical user interface (GUI) that simultaneously reports the driver's efficiency score based on use of cruise control at freeway speeds and lost dollars.

In at least one embodiment, the driver efficiency score for cruise control is visually presented on a graphical user interface (GUI) that provides a graphical depiction of speed versus time, where the graph can be used to visualize portions a trip where cruise control could have been used, and portions a trip where cruise control could not have been used. In at least one related embodiment, cruise control is assumed to be possible at speeds of greater than 55 MPH (noting that such a value is exemplary, and not limiting). In at least one related embodiment, the GUI simultaneously displays a pie chart that enables a viewer to visually determine what portion of a trip cruise control was not possible, what portion of a trip cruise control was possible and not used, and what portion of a trip cruise control was possible and was used. In at least one related embodiment, the GUI simultaneously displays an interactive map of the trip. In at least one related embodiment, the GUI simultaneously displays a chart of fuel cost, including fuel cost for the portion of the trip where cruise control was not possible, fuel cost for the portion of the trip where cruise control was possible but not used, and fuel cost for the portion of the trip where cruise control was possible and was used.

In at least one embodiment, an optimal efficiency for a specific trip is visually presented on a graphical user interface (GUI) that provides a textual description of each driver performance metric that applied to that trip, and how each metric contributed to an optimal efficiency of 100%. In at least one embodiment the optimal efficiency is based on proper RPM use and proper cruise control use alone. In at least one embodiment the optimal efficiency is based on proper RPM use, proper cruise control use, and overspeed time. In at least one embodiment the optimal efficiency is based on proper RPM use, proper cruise control use, overspeed time and idle time. In at least one related embodiment, the GUI simultaneously displays a pie chart that enables a viewer to visually determine what metric contributed relatively larger amounts to the optimal efficiency. In at least one related embodiment, the data present is not optimal efficiency, but actual driver efficiency for that trip.

In at least one embodiment, the driver efficiency score for use of top gear is visually presented on a graphical user interface (GUI) that provides a graphical depiction of gear selection versus time, where the graph can be used to visualize portions a trip where top gear was used, and portions a trip where top gear was not used. In at least one related embodiment, top gear information can be viewed as a teaching tool, but is not included in an overall driver efficiency score, if that overall driver efficiency score also uses an optimal RPM as a driver efficiency metric (because using top gear and RPM would overly penalize drivers whose route required the use of a lower gear due to terrain or load, where using a lower gear in the optimal RPM range is actually more efficient). In at least one related embodiment, the GUI simultaneously displays an interactive map of the trip. Selecting a data element in the graph will automatically change the map view to highlight the corresponding location. In at least one related embodiment, the GUI simultaneously displays a chart of fuel cost, including fuel cost for the portion of the trip where top gear was not used, and fuel cost for the portion of the trip where top gear was used.

In at least one embodiment, the driver performance metric for RPM use for a trip is visually presented on a graphical user interface (GUI) that provides a histogram based on miles traveled and time resent in a plurality of different RPM ranges. In a related embodiment, the RPM ranges are separated by increments of 100 RPMs. In a related embodiment, the RPM ranges are separated by increments of 50 RPMs.

In at least one embodiment, the driver performance metric for idle time for a trip is visually presented on a graphical user interface (GUI) that provides a histogram based on idle time in minutes and fuel used during idle in gallons for the trip. In at least one related embodiment, the GUI simultaneously displays an interactive map of the trip, enabling a user to quickly determine the locations of excess idle time events.

In at least one embodiment, the MPG for the trip is visually presented on a graphical user interface (GUI) that provides a graphical depiction of MPG versus time, where the graph can be used to visualize portions a trip where MPG was highest and lowest. In at least one related embodiment, the GUI simultaneously displays an interactive map of the trip. In at least one related embodiment, the GUI simultaneously displays a chart of fuel cost, including fuel cost for the portion of the trip where MPG was relatively high, fuel cost for the portion of the trip where MPG was relatively moderate, and fuel cost for the portion of the trip where MPG was relatively low. In at least one related embodiment, the GUI simultaneously displays a pie chart that enables a viewer to visually determine what portion of a trip was spent at a relatively low MPG, what portion of a trip was spent at a relatively moderate MPG, and what portion of a trip was spent at a relatively high MPG.

In at least one embodiment, the driver efficiency score for optimal RPM use is visually presented on a graphical user interface (GUI) that provides a graphical depiction of RPM versus time, where the graph can be used to visualize portions of a trip where RPM fell in an optimal range (visually defined on the graph), and portions of a trip where RPM fell outside the optimal range. In at least one related embodiment, the optimal range is uniquely defined for different types of vehicles (i.e., based on the specific power plant, manufacturer, and fuel maps). In at least one related embodiment, the GUI simultaneously displays a summary of total miles and miles spent outside the sweet zone, as well as an efficiency percentage. In at least one related embodiment, the GUI simultaneously displays an interactive map of the trip. In at least one related embodiment, the GUI simultaneously displays a chart of fuel cost, including fuel cost for the portion of the trip where RPM was optimal, and fuel cost for the portion of the trip where RPM was not optimal.

In at least one embodiment, the driver efficiency score for over speeding is visually presented on a graphical user interface (GUI) that provides a graphical depiction of speed versus time, where the graph can be used to visualize portions a trip where speed exceeded a predetermined setting (generally 55 MPH, but different operators may select different values based on their policies. In at least one related embodiment, the GUI simultaneously displays an interactive map of the trip. In at least one related embodiment, the GUI simultaneously displays a pie chart that enables a viewer to visually determine what portion of a trip was spent at approved speeds, and what portion of a trip was spent at over speeds. In at least one related embodiment, the GUI simultaneously displays a chart of fuel cost, including fuel cost for the portion of the trip where speed was normal, and fuel cost for the portion of the trip where over speeding occurred.

In at least one embodiment, the data collected from the vehicle includes the altitude for every GPS point the vehicle creates. This allows the ability to check the altitude delta between every GPS point to determine if the vehicle is going uphill, downhill, or traveling over flat terrain. In at least one embodiment where a driver efficiency metric involving optimal RPM range is employed, data corresponding to a downhill portion of the trip is ignored. In at least one related embodiment, anytime the delta between successive GPS points is less than −1%, that section of the trip is excluded from the driver efficiency calculation. That is because drivers may need to exceed the optimal RPM range for engine braking when going downhill (for safety).

Another concept disclosed is tracking vehicle performance data using a telematics device that wirelessly conveys vehicle and location data to a remote server to analyze turbo boost pressure to determine if maintenance is desirable to increase fuel economy.

One aspect of such concepts is analyzing vehicle performance, such as MPG, based on route metrics, including terrain, load, driver performance (max use of cruise, low idles, few over speed events, and high operation in an engine sweet zone) to quantitatively analyze performance. Pure MPG does not tell the whole story, as a driver carrying a heavy load uphill will have worse fuel economy that a driver pulling a light load over flat terrain, even if the driving going uphill is using best driving practices, and the driver over the flat is driving poorly and wasting fuel. The lower MPG in this hypothetical is actually related to more efficient vehicle use, and the uphill driver should be rewarded, not the other driver.

Metrics involved in an exemplary driver fuel efficiency report include over speed, idle, RPM, use of cruise control, use of high or top gear. Empirical data indicate that fleet operators can achieve up to 7% fuel savings when training their drivers based on these analytics.

Another concept disclosed is tracking vehicle performance data using a telematics device that wirelessly conveys vehicle and location data to a remote server to analyze turbo boost pressure to determine if maintenance is desirable to increase fuel economy.

Another concept disclosed is tracking vehicle performance data using a telematics device that wirelessly conveys vehicle and location data to a remote server to analyze differential pressure in the engine to detect clogged fuel filters that should be replaced to increase fuel economy.

Another concept disclosed is tracking vehicle performance data using a telematics device that wirelessly conveys vehicle and location data to a remote server to analyze the diesel regeneration system to determine if an additional regen cycle, which does consume fuel, may actually result in increased fuel economy. The analysis is based on differential pressure measurements on air filter, and empirical data can be collected on different engine types to determine what the pressure threshold should be to indicate the need for a regen cycle.

Another concept disclosed herein is to include ambient factors, such as route terrain, wind, weather, traffic, head wind, tailwind, to normalize driver scores before comparing them, so drivers facing a headwind or uphill route are not scored lower than drivers with a tailwind or downhill route.

The above noted methods are preferably implemented by at least one processor (such as a computing device implementing machine instructions to implement the specific functions noted above) or a custom circuit (such as an application specific integrated circuit).

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a high level flow chart showing the overall method steps implemented in accord with one exemplary embodiment for achieving the concepts disclosed herein, in which a remote user monitors can evaluate a driver performance based on an efficiency score and a lost fuel cost derived from empirical data collected during the drivers operation of the vehicle;

FIG. 2 schematically illustrates a vehicle that includes a plurality of sensors configured to collect the required metrics;

Figure 4:
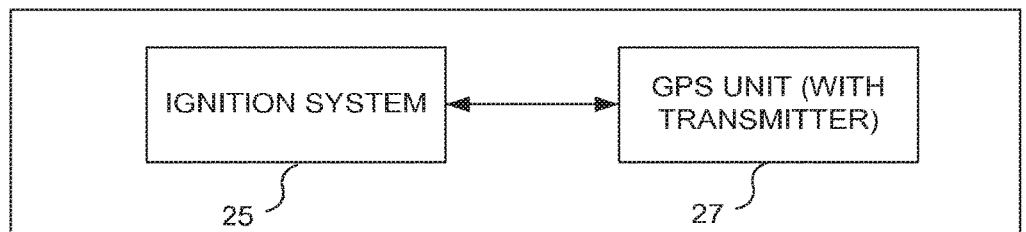
Figure 5:
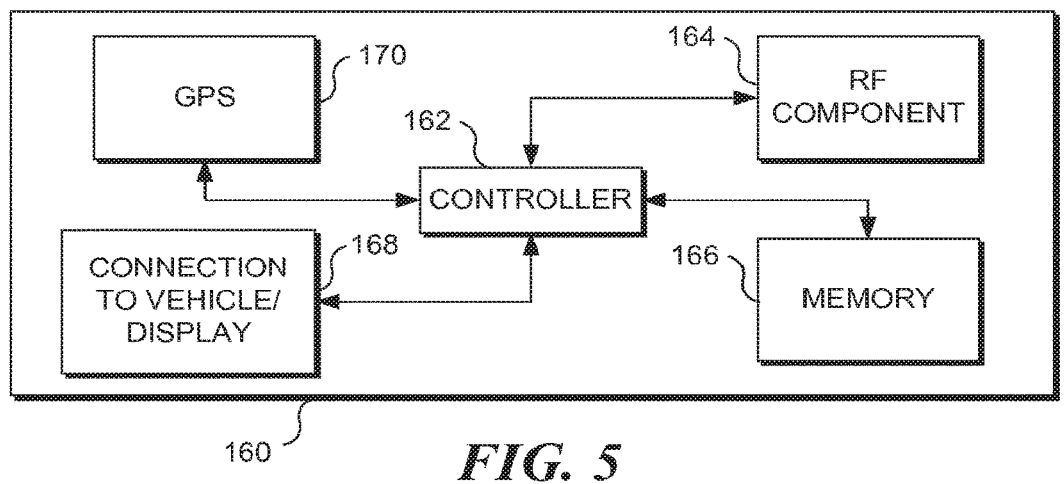
Figure 6:
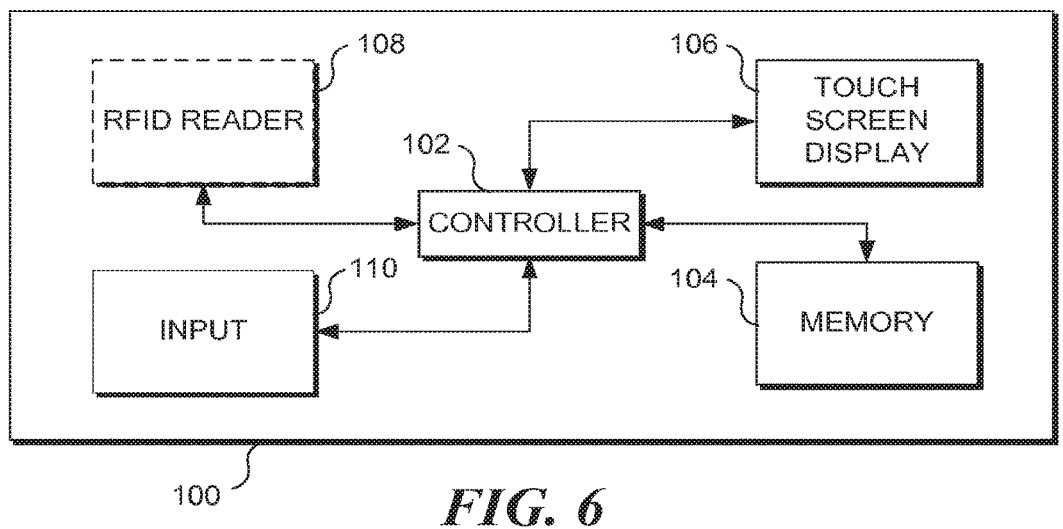
Figure 7:
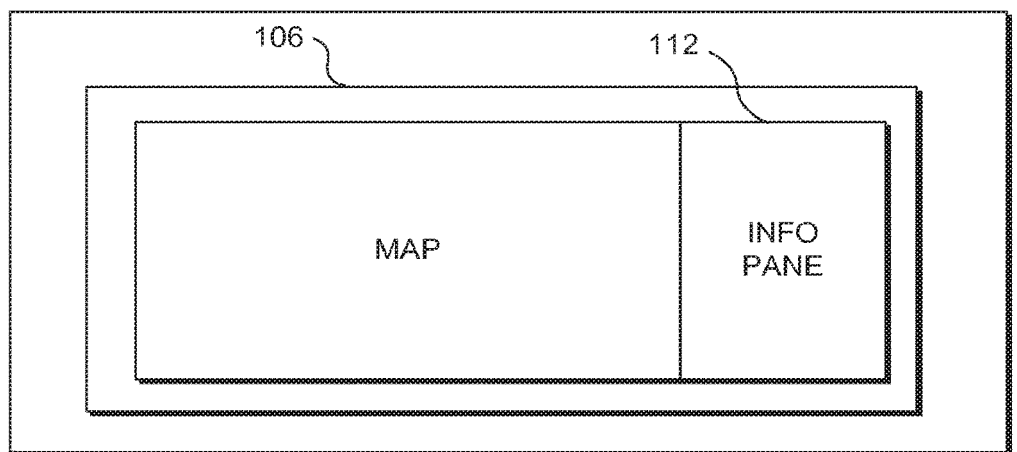
Figure 8:
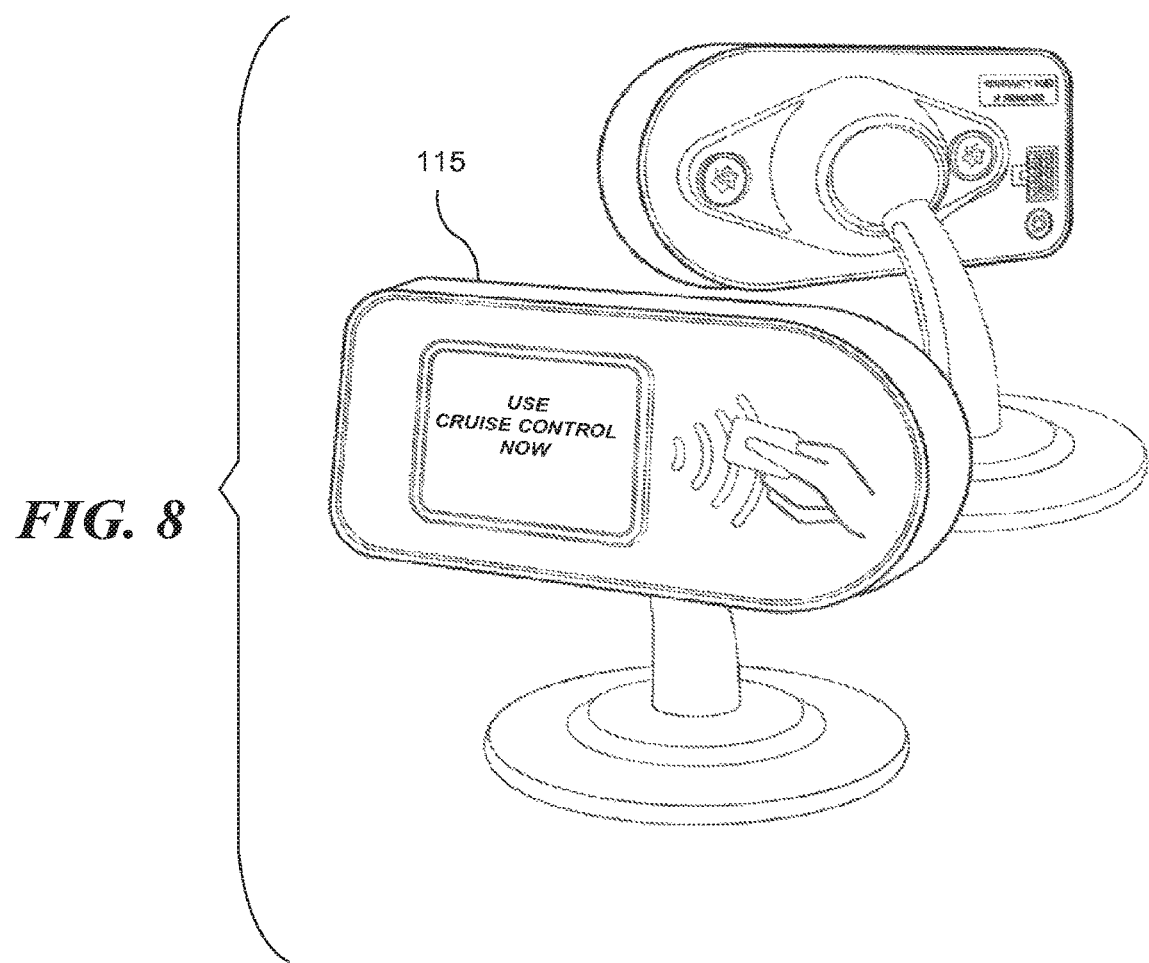
Figure 9:
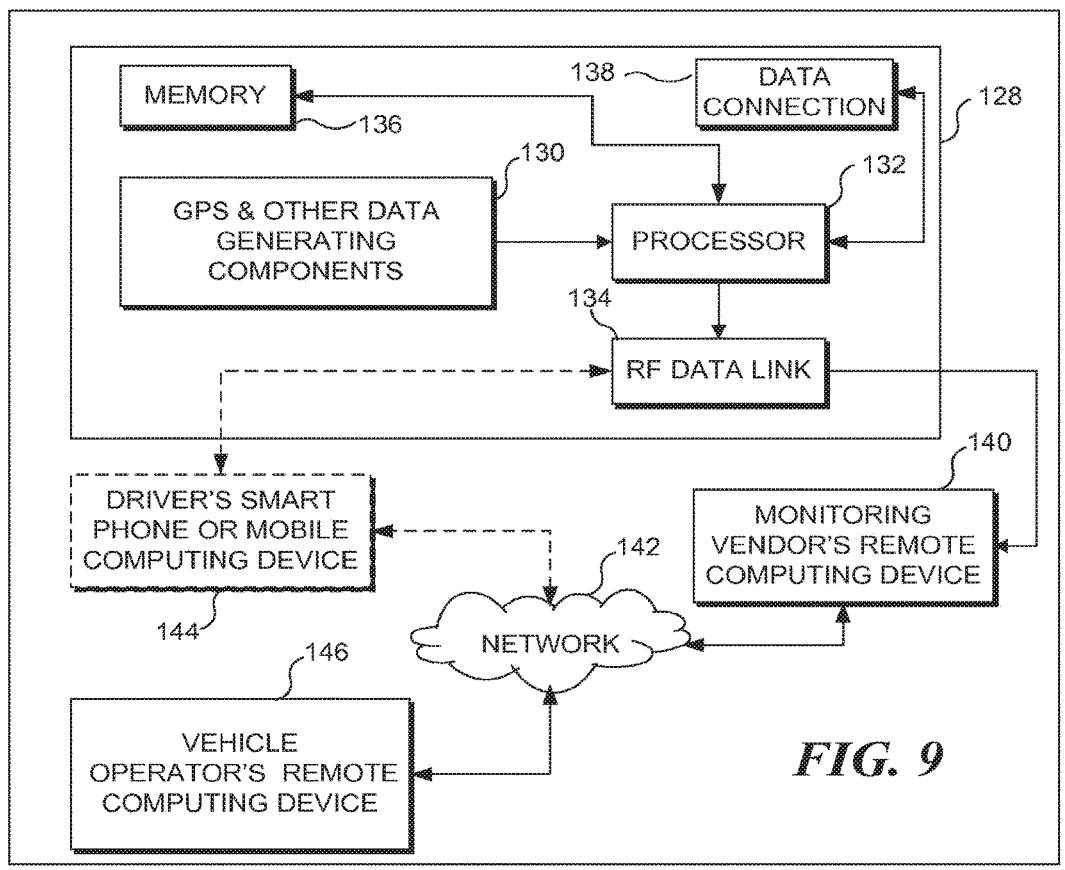
Figure 10:
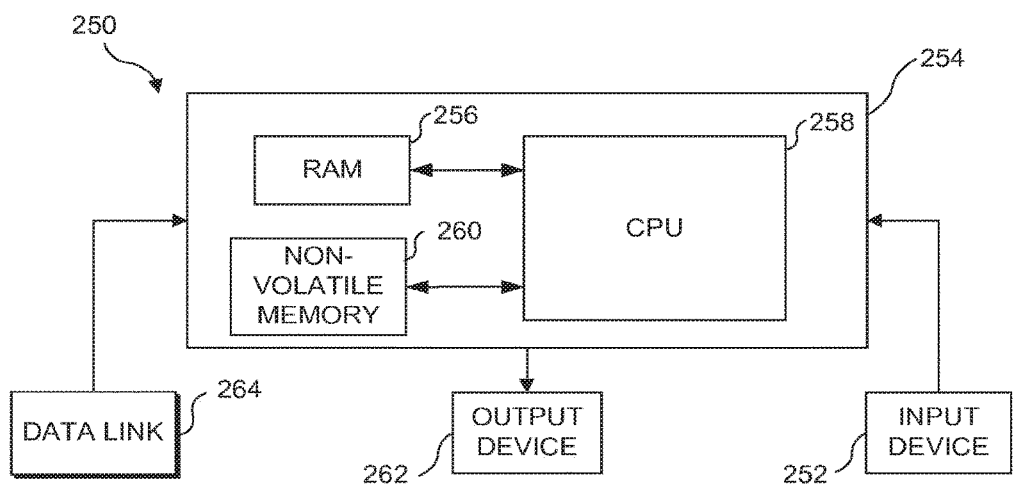
Figure 12:
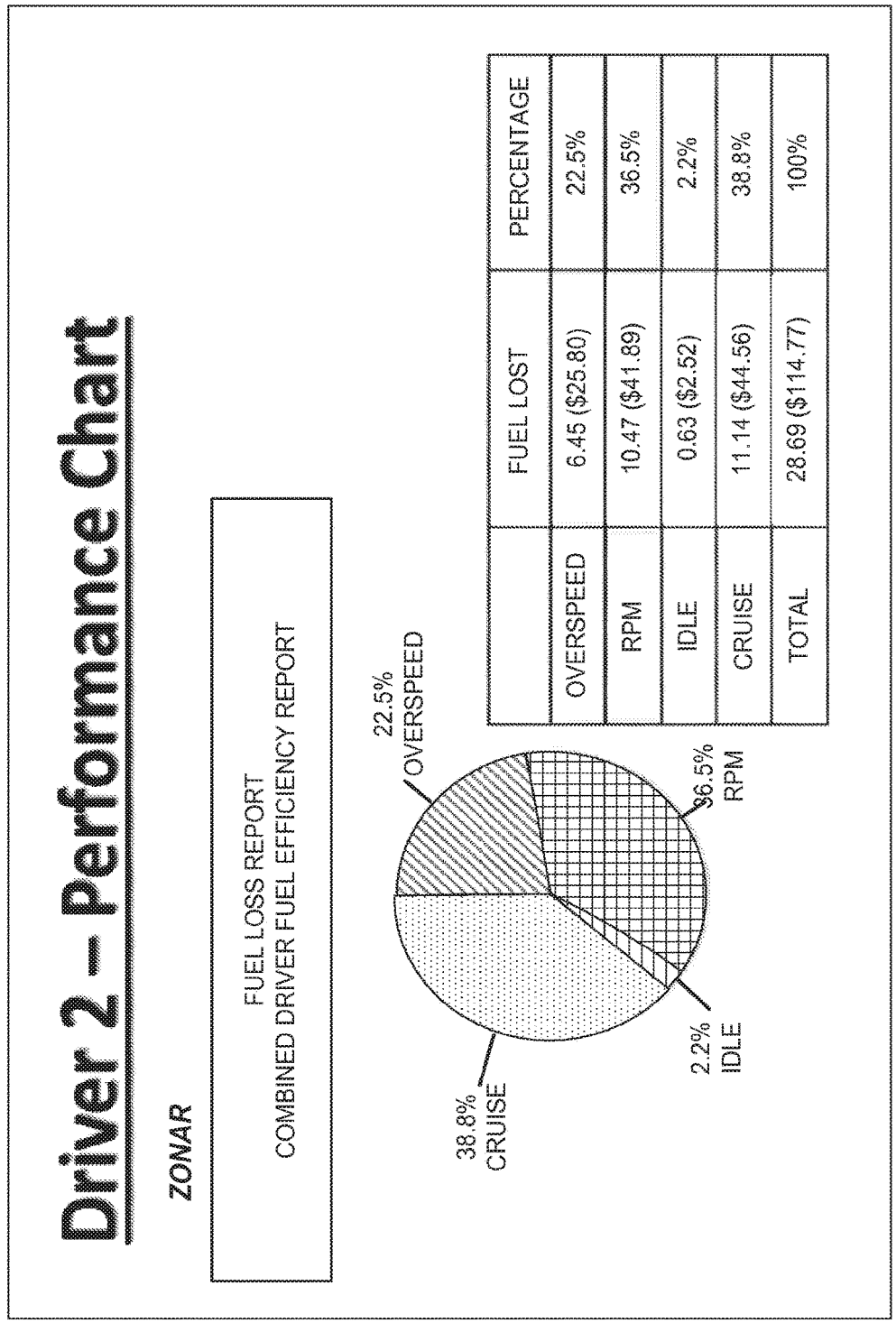
Figure 13:
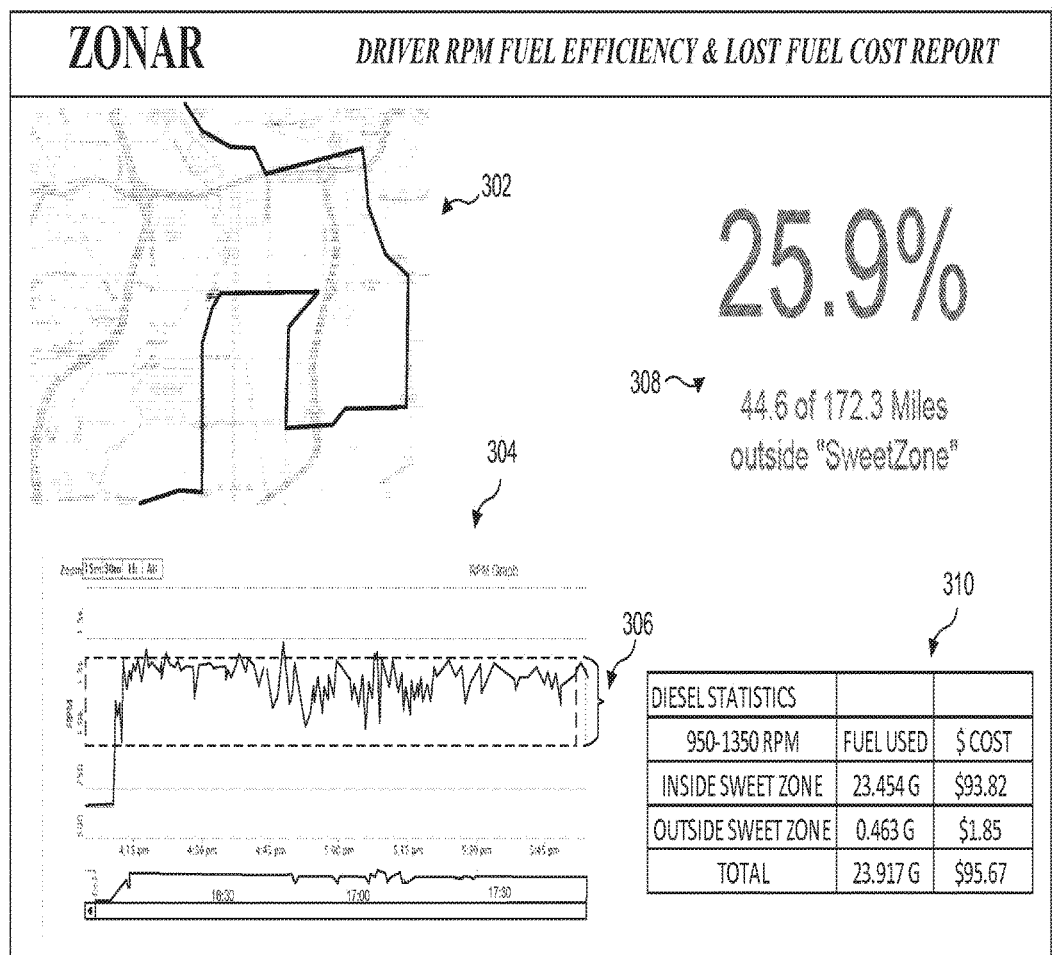
Figure 14:
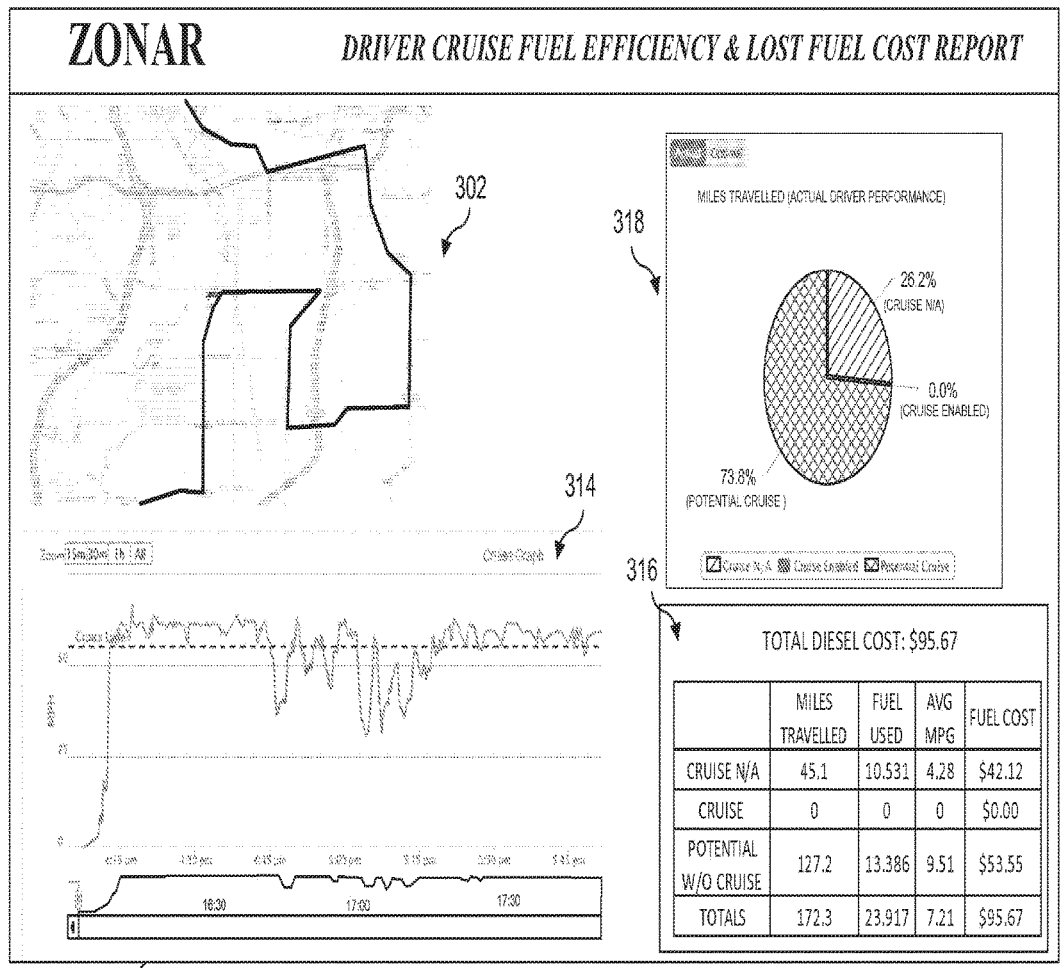
Figure 15:
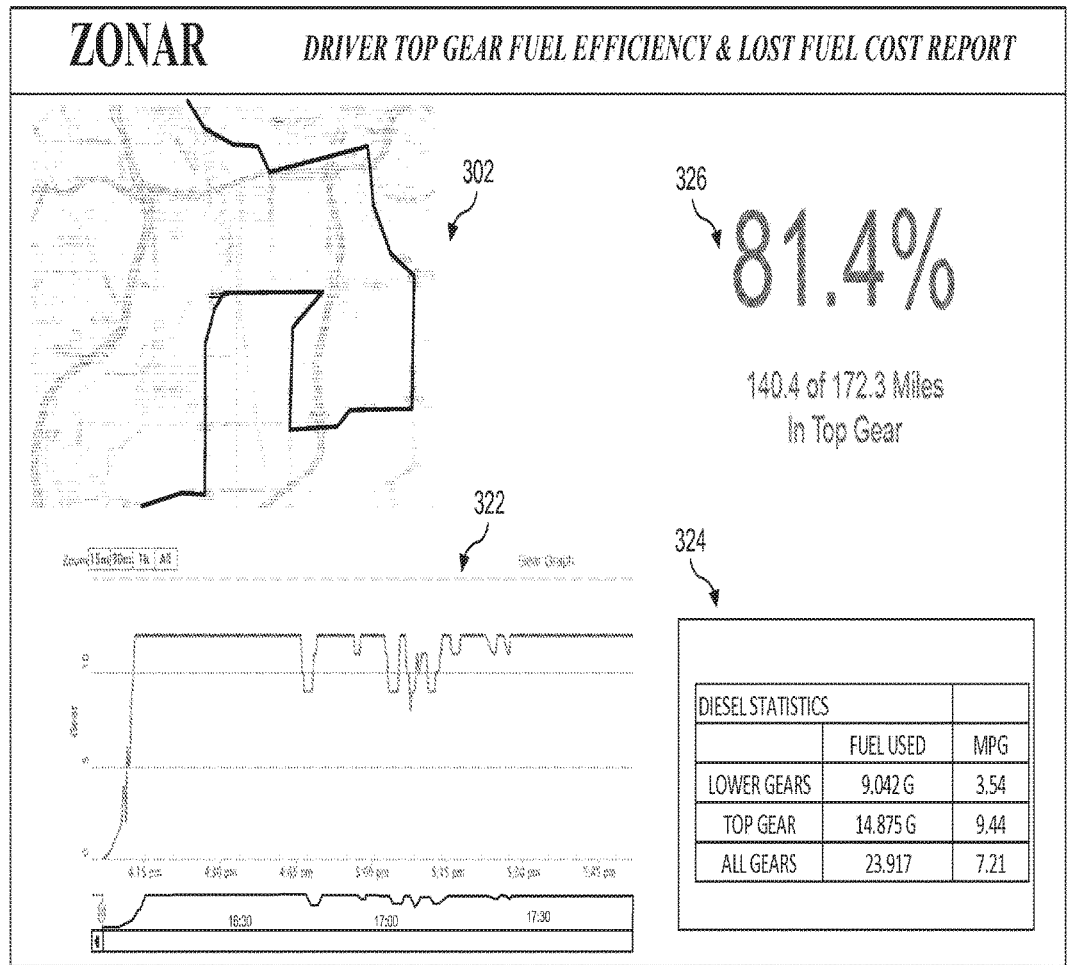
Figure 16A:
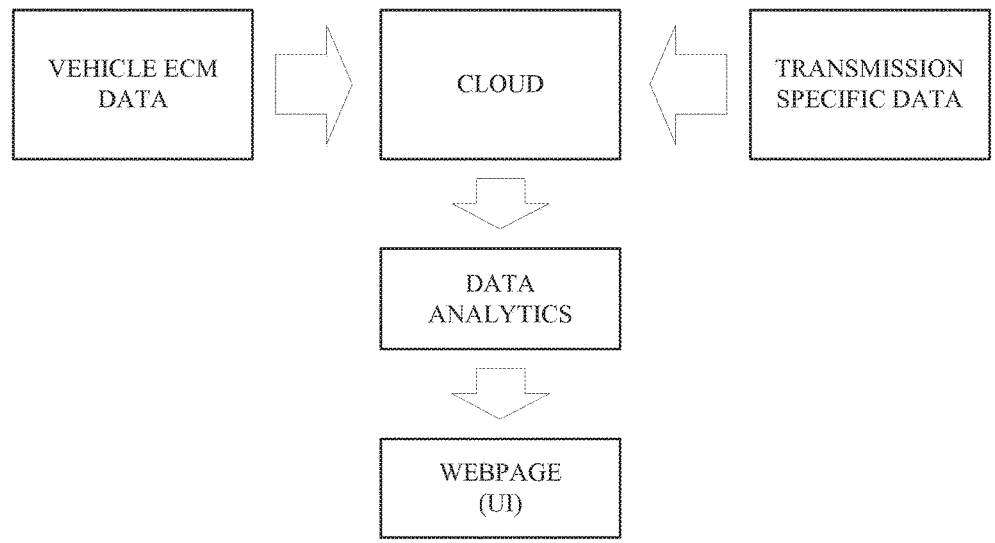

FIG. 4 schematically illustrates a vehicle that includes a GPS unit with a wireless transmitter utilized in some embodiments disclosed herein;

FIG. 5 is a functional block diagram of an exemplary telematics device added to an enrolled vehicle to implement one or more of the methods disclosed herein;

FIG. 6 is a functional block diagram of an exemplary telematics oriented tablet for in vehicle use that may be employed in accord with some aspect of the concepts disclosed herein;

FIG. 7 is a functional block diagram of an exemplary telematics oriented tablet for in vehicle use implementing a navigation app that is presented to the driver during vehicle operation, such that an info pane is not consumed by the map portion, and any driver coaching can be visually presented to the driver on the info pane;

FIG. 8 schematically illustrates an accessory display that can be used along with a processor in the vehicle to display any real time driver coaching, where the accessory display can also be used to uniquely log in drivers, so any reports identify the correct driver;

FIG. 9 is a functional block diagram illustrating exemplary elements in a driver efficiency and lost fuel cost monitoring system in accord with one aspect of the concepts disclosed herein;

FIG. 10 is an exemplary computing environment for implementing some of the concepts disclosed herein;

FIG. 11 is a data table illustrating why simply calculating MPG does not inform a fleet operator which drivers are operating most efficiently;

FIG. 12 is an exemplary screen shot of a webpage accessed by a user to see detailed analytical information that can be used to understand that Driver #2 from FIG. 11 performed less efficiently, even though that driver had a higher MPG for his trip;

FIG. 13 is an exemplary screen shot of a webpage accessed by a user to see detailed analytical information that can be used to understand how well a driver performed based on an RPM fuel efficiency metric tracking the drivers use of a most efficient RPM range, and how that efficiency rating translated into additional fuel costs;

FIG. 14 is an exemplary screen shot of a webpage accessed by a user to see detailed analytical information that can be used to understand how well a driver performed based on a cruise control usage fuel efficiency metric tracking the drivers use of cruise control at highway speeds, and how that efficiency rating translated into additional fuel costs;

FIG. 15 is an exemplary screen shot of a webpage accessed by a user to see detailed analytical information that can be used to understand how well a driver performed based on a top gear usage fuel efficiency metric tracking the drivers use of top gear, and how that efficiency rating translated into additional fuel costs;

FIGS. 16A and 16B provide details an exemplary technique to generate the top gear metric of FIG. 15 using data collected from the vehicle and an understanding of the vehicle's design characteristics; and FIGS. 17A and 17B are portions of an exemplary graphical user interface (or webpage) providing a summary of the fuel efficiency metrics disclosed herein for a plurality of drivers.

FIGURES AND DISCLOSED EMBODIMENTS ARE NOT LIMITING

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein (even embodiments disclosed in the Summary) can be combined with one or more features of any other embodiment that is disclosed, unless otherwise indicated.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits). As used herein and in the claims that follow, the terms processor and controller have been used interchangeably with respect to describing an element to implement a specific logical function, and applicant intends the terms to be interpreted broadly, as encompassing elements that implement specifically defined logical functions (which in some cases rely on machine instructions stored in a memory to implement the function). Even where the term processor is used in place of the term controller, applicant believes that the artisan of skill would be able to readily determine from the disclosure provide herein what additional elements, such as peripherals (ports, clock, timers, UARTs, and ADC) and memory (including, but not limited to EEPROM, SRAM, EPROM, and flash) will be used in connection with such a processor to implement the described logical function.

Exemplary Logic for Calculating Driver Efficiency and Lost Fuel Cost

Figure 1:
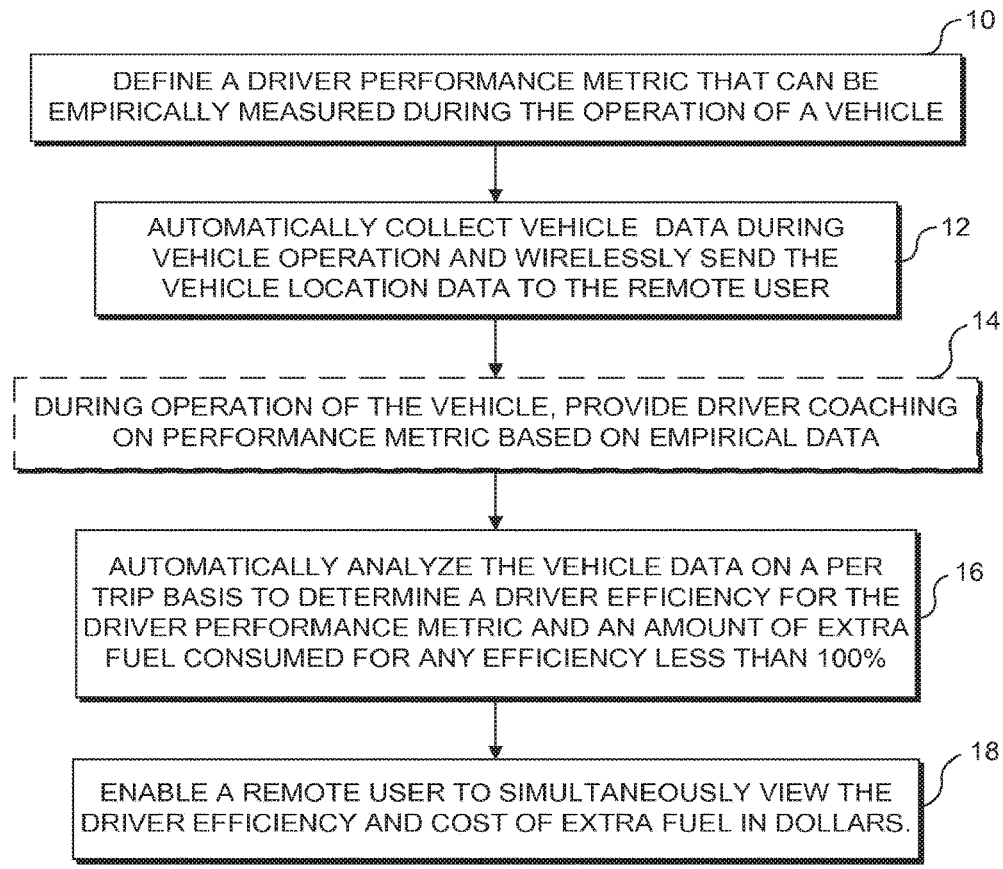

FIG. 1 is a high level flow chart showing the overall method steps implemented in accord with one aspect of the concepts disclosed herein. In general, the method being disclosed will be used by operators of fleets of vehicles. While it could be used in the context of a single vehicle, it will likely be of particular value to fleet operators. Certain steps of the method are implemented by a remote user accessing an application that allows the remote user to view one or more reports providing information about a driver's efficiency and lost fuel costs associated with efficiency scores of less than 100% for one or more driver performance metrics. Exemplary metrics include one or more of driver use of cruise control at highway speeds, driver's control of engine RPM to maximize time spent in most efficient RPM range, over speeding events (where driver exceeded a predefined maximum speed), and/or idle time. The RPM range can be a generic default range (such as 1300-1350 RPM) and can also be customized based on OEM data for specific power plants and configurations. Certain steps of the method are automatically implemented by a controller remote from the vehicle. Certain steps of the method are automatically implemented by a controller located at the vehicle.

Referring to FIG. 1, in a block 10 one or more driver performance metrics that relate to fuel consumption are defined. In at least one embodiment only one metric is employed.

In at least one embodiment at least two metrics are employed. In one particular preferred embodiment a combination of time spent outside of an optimal RPM range and time not spent in cruise control when driving at freeways speeds are used to calculate driver efficiency. In at least one embodiment an individual efficiency is calculated for each metric, and combined driver efficiency is also calculated.

In at least one embodiment three metrics are employed; time spent outside of an optimal RPM range, time not spent in cruise control when driving at freeways speeds, and idle time over a predetermined limit. In at least one embodiment an individual efficiency is calculated for each metric, and combined driver efficiency is also calculated.

In at least one embodiment three metrics are employed; time spent outside of an optimal RPM range, time not spent in cruise control when driving at freeways speeds, and time spent in excess of a predetermined speed (such as 55 MPH). In at least one embodiment an individual efficiency is calculated for each metric, and combined driver efficiency is also calculated.

In at least one embodiment four metrics are employed; time spent outside of an optimal RPM range, time not spent in cruise control when driving at freeways speeds, time spent in excess of a predetermined speed, and idle time over a predetermined limit. In at least one embodiment an individual efficiency is calculated for each metric, and combined driver efficiency is also calculated.

Referring once again to FIG. 1, in a block 12 data relating to driver fuel efficiency is collected during vehicle operation. The specific data collected will be a function of the metric being used to calculate driver efficiency. Where idle time is a metric, engine run time without motion (or without vehicle in gear) is collected. Where over speed is a metric, speed data is collected. Where top gear use metrics are collected, data related to top gear is collected (FIGS. 16A and 16B provide details on an exemplary top gear calculation, as top gear data is not always readily available from a vehicle data bus). If cruise control metrics are employed, speed data and cruise control status data are collected. If the RPM sweet zone metric is used, RPM data is collected. In a particularly preferred implementation, that enables very detailed efficiency analysis to be conducted, incremental fuel use data is collected from a vehicles fuel injectors. Heavy duty diesel engines are often equipped with fuel injectors that incrementally measures every half liter of fuel delivered. Where such data can be extracted from a vehicle ECU or data bus, that data is collected. Positional (GPS in an exemplary but not limiting embodiment) is also very valuable. The combination of incremental fuel use data and position data enables a trip to be separated into segments, each segment being defined by sequential fuel measurements. For each segment, fuel consumed and mileage traveled will be known. Where RPM data and/or cruise control data are collected, the RPM range and/or use of cruise control will be known for each segment. For segments where optimal RPM range is not used, a calculation can be made on how much fuel was wasted in that segment. For segments where cruise control was not used at speeds of over 55 MPH (noting that predetermined amount can be adjusted upward or downward based on user preference), a calculation can be made on how much fuel was wasted in that segment.

In at least one embodiment, the function of block 12 will be implemented by equipping enrolled vehicles with a telematics device (noting that this can be simultaneously implemented by a fleet of vehicles) which collects vehicle position data during vehicle operation, as well as data needed to measure the other metrics being employed to measure efficiency (generally as noted above). In at least some embodiments the telematics device is logically coupled with a vehicle data bus to extract data from the vehicle data bus and/or specific vehicle controllers/ECUs. That vehicle position data (and other data) is wirelessly communicated to a remote monitoring service (generally the same remote service employed to implement the steps of block 10, although the functions could be distributed to different computing systems). In general, the vehicle location is updated on a frequent basis (i.e., once every 5 minutes or less during normal vehicle operation, noting that the specific time interval between updates can vary considerably).

In an optional block 14, some of the data collected at the vehicle can be used to provide real time driver coaching. While some detailed analysis of the data is better suited to be performed remotely, some useful feedback can be readily presented at the vehicle, to provide drivers with the opportunity to improve their driver efficiency scores. Fleet operators provide more incentives for drivers earning better scores, and even disincentives for drivers with lower scores. In general, the coaching is provided visually using a display in the vehicle, although the concepts disclosed herein encompass audible coaching as well. Where idle time affects a driver's efficiency score, an alert can be displayed to the driver when idle time exceeds the predetermined limit (some fleet owners may set the limit to zero, others may adopt a reasonable time period, such as 5 minutes). If a driver is issued a mobile computing device such as a phone, pager, or mobile tablet, the alert can be sent to that mobile device, in case the driver is not in the cab of the vehicle to notice an in cab display. Where a speed event over a predetermined speed affects a driver's efficiency score, an alert can be displayed to the driver when such speed events occur, to remind the driver their score is being lowered. Where RPM usage outside a predefined sweet zone affects a driver's efficiency score, an alert can be displayed to the driver when such RPM events occur, to remind the driver their score is being lowered. Where cruise control is not used when a certain speed is reached and that non-use affects a driver's efficiency score, an alert can be displayed to the driver to remind him or her to use cruise control to improve their efficiency score.

Note that block 14 is optional, as the data collected and available remotely can be used in driver training sessions after a driver has completed a trip. The data can be used to teach drivers what behavior unique to their driving patterns most negatively contributes to their score (drivers can also be told what they excel at).

In a block 16, a processor remote from the vehicle automatically analyzes the data collected from the vehicle and determines a driver efficiency score for one or more metrics that were defined in block 10. Considerable variability in the calculation of an efficiency score are possible, in general the score should be based on empirical data and be useful to highlight behavior that reduces efficiency.

In one exemplary embodiment, an idle efficiency score is calculated based on determining how much fuel was consumed by the vehicle for a trip. Then, a determination is made as to how much fuel was consumed in that trip by idling (any idle over any predetermined limit). An average idle burn time value can be used to calculate how much fuel was consumed during idle for that specific trip. Assume 100 gallons of fuel were used in trip A, and 0 gallons of fuel were consumed idling over the predetermined limit. The driver's idle time score is 100%. Assume 100 gallons of fuel were used in trip B, and 5 gallons of fuel were consumed idling over the predetermined limit. The driver's idle time score is 95%. In some embodiments, no idle time percentage is calculated; rather a report is generated showing a dollar value of the fuel lost due to idle.

In one exemplary embodiment, an over speed efficiency score is calculated based on determining how much fuel was consumed by the vehicle for a trip. Then, a determination is made as to how much fuel was consumed in that trip by speeding (any speed over any predetermined limit). In an exemplary embodiment, it is assumed that MPG is reduced by 0.1 MPG for every mile over 55 MPH. That value (or some similar value) can be used to calculate how much extra fuel was consumed by over speed events for that specific trip. Assume 100 gallons of fuel were used in trip C, and 0 gallons of fuel were consumed during over speeding. The driver's over speed score is 100%. Assume 100 gallons of fuel were used in trip D, and 3 gallons of fuel were consumed by speeding. The driver's over speed efficiency score is 97%.

In one exemplary embodiment, an RPM efficiency score is calculated based on separating the trip into segments based on incremental fuel use measurements. GPS data is used to determine the length of each segment in miles, enabling the MPG of discrete segments to be calculated. The trip data is analyzed to determine each segment where RPM use was outside the sweet zone. The actual MPG for that segment is increased by a factor associated with fuel efficiency increase for optimizing RPM to obtain a theoretical RPM MPG. In an exemplary embodiment, that factor is 5%. In some embodiments, users can adjust that up or down based on their experience. The actual MPG and theoretical RPM MPG (for each segment where RPM was outside the sweet zone) and actual miles traveled in that segment are used to determine how much fuel was wasted in that segment. The segments for a single trip are added together to determine how much was fuel wasted due to failure to optimize RPM. In some embodiments, segments known to be downhill segments are ignored, as safety considerations can require RPMs to be increased for engine braking, and that is a best practice, not a practice that should be penalized. Assume 100 gallons of fuel were used in trip E, and no segments indicated RPM use outside of the optimum range. The driver's RPM efficiency score is 100%. Assume 100 gallons of fuel were used in trip F, and 6 extra gallons of fuel were consumed segments with non-optimal RPM use. The driver's RPM efficiency score is 94%.

In one exemplary embodiment, a cruise control efficiency score is calculated based on separating the trip into segments based on incremental fuel use measurements. GPS data is used to determine the length of each segment in miles, enabling the MPG of discrete segments to be calculated. The trip data is analyzed to determine each segment where cruise control was not used but could have been used (based on speed, an exemplary speed being 55 MPH, such that only no cruise control use over 55 MPH is being scored). The actual MPG for that segment is increased by a factor associated with fuel efficiency increase for using cruise control to obtain a theoretical cruise MPG. In an exemplary embodiment, that factor is 7%. In some embodiments, users can adjust that up or down based on their experience. The actual MPG and theoretical cruise MPG (for each segment where cruise control could have been used but was not used) and the miles traveled for that segment are used to determine how much fuel was wasted in that segment. The segments for a single trip are added together to determine how much fuel was wasted due to failure to use cruise control. In some embodiments, segments known to be downhill segments are ignored, as some operators have safety practices that don't allow cruise use downhill, and safety practices that reduce fuel efficiency should not be penalized. Assume 100 gallons of fuel were used in trip G, and no segments indicated failure to use cruise control. The driver's cruise control efficiency score is 100%. Assume 100 gallons of fuel were used in trip H, and 11 extra gallons of fuel were consumed segments with non-optimal RPM use. The driver's RPM efficiency score is 89%.

The more often fuel use measurements are made, the smaller the segments will be for a given speed. In general, the common ½ liter increment is sufficiently detailed such that each segment is relatively small. Even at freeway speeds, segments are often less than 1 mile in length. Still, it is possible that RPM use or cruise control use might be good for part of a segment and bad for another part of the same segment. In some embodiments, if any "bad" behavior (RPM out of the sweet zone or no cruise use when cruise was possible) occurs in a segment, the entire segment is ignored (i.e., the segment will not reduce the driver's efficiency score). In still other embodiments, the segment is separated into "good" and "bad" portions, and the bad portion is used to reduce the drivers efficiency score (the bad portion is treated as a mini segment, and efficiency is calculated generally as discussed above, based on the proportional size of the bad segment relative to the overall segment).

In some embodiments, the above analysis is automatically performed for all trips, for all drivers, and the results are stored for review by a remote user on demand. In some embodiments, threshold filters are used such that drivers having particularly poor efficiency scores are automatically and affirmatively reported (such as via email or a text alert). In other embodiments, the analysis for a particular driver for a particular trip is generated on demand, based on an inquiry. As some companies prefer not to store some of the underlying data in perpetuity (for example, there is an FMCSA requirement to store GPS data that can be used to verify driver logs for 6 months), performing the analysis in advance ensures that some of the data required for the analysis has not been deleted as part of a defined data retention policy for that data.

Referring once again to FIG. 1, in a block 18 a remote use is enabled to view a report where the driver efficiency and a cost of lost fuel associated with efficiency scores of less than 100% efficiency can be simultaneously viewed. Exemplary graphical user interfaces that can be used to provide driver fuel efficiency and lost fuel costs are provided in FIGS. 12-15, 17A and 17B.

Where the analysis is based on ignoring downhill segments, various data sources can be used to determine if a segment is downhill. The GPS data can be analyzed to determine elevation changes. Road grade data can also be acquired from third party sources, such as by cross referencing the GPS coordinates with the Shuttle Radar Topography Mission (SRTM) database. Other map vendors, such as BING and Google, can also provide elevation data. In at least one embodiment, downhill is less than a −1% road grade.

Exemplary Vehicle Equipped with Data Collecting Elements

Figure 2:
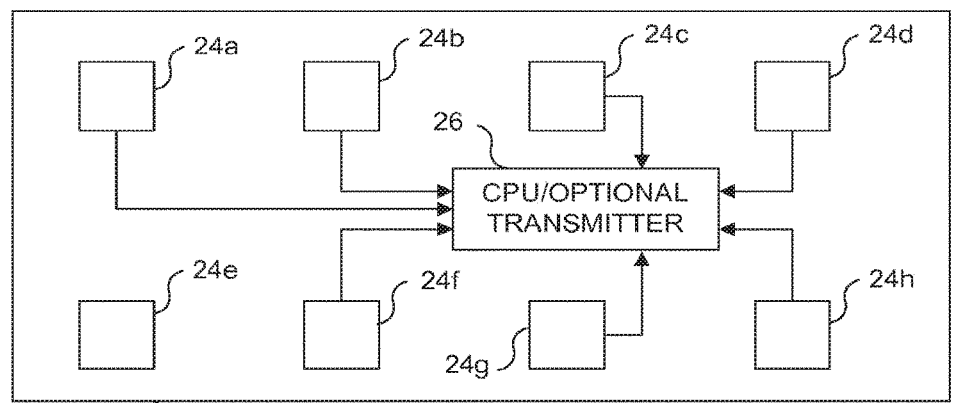

FIG. 2 schematically illustrates a vehicle including a plurality of sensors configured to collect the required metrics. A vehicle 22, such as a bus or a truck, includes a plurality of sensors 24a-24h. It should be recognized that the specific number of sensors, and the specific types of sensors and types of data collected by the sensors, are not critical, so long as the sensors collect data for the desired metrics. As noted above, a plurality of different metrics have been specifically identified, however it should be recognized that such metrics are intended to be exemplary, and not limiting on the concepts disclosed herein. In the disclosed exemplary embodiment, each sensor is coupled to a CPU 26 (which, as described in greater detail below, may in some of embodiments be replaced with (or provided in addition to) a transmitter).

Figure 3A:
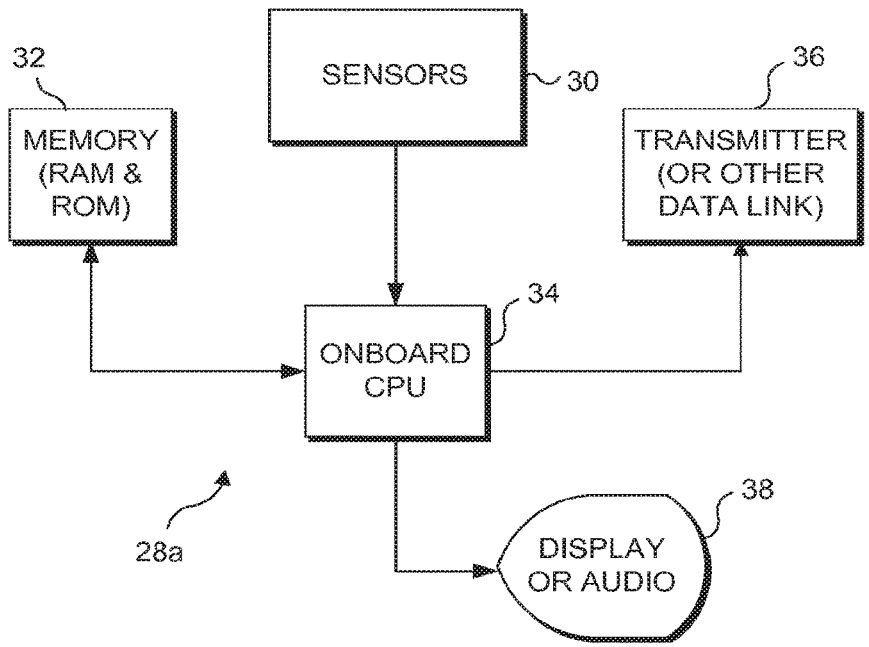
FIG. 3A is a functional block diagram illustrating the functional elements of an embodiment in which at least some data evaluation is processed within the vehicle in order to provide real time coaching to the driver.

FIG. 3A is a functional block diagram 28a illustrating the functional elements of an exemplary embodiment in which at least some of the metrics are processed within the vehicle to provide real time driver coaching related to behavior that will negatively impact the driver's efficiency score (see block 14 of FIG. 1). The vehicle is equipped with sensors 30 configured to collect the required metrics. The sensors are logically coupled with an onboard vehicle CPU 34, which is configured to implement the method step generally described above for block 14 of FIG. 1. CPU 34 is logically coupled to a memory 32 in which are stored the machine instructions that are executed by the CPU to carry out these logical steps. The plurality of metrics collected by sensors 30 can also be stored in memory 32. A (preferably wireless) transmitter 36 (or other data link) can be included to enable the plurality of metrics to be communicated to a remote computing device for detailed analysis. A display or audio device 38 is included to provide real-time feedback to the driver (by displaying coaching to the driver in real-time). As discussed above, the visual or audio presented to the driver will inform the driver what behavior is reducing his efficiency score (no cruise, wrong RPM, overspeed, idle).

Figure 3B:
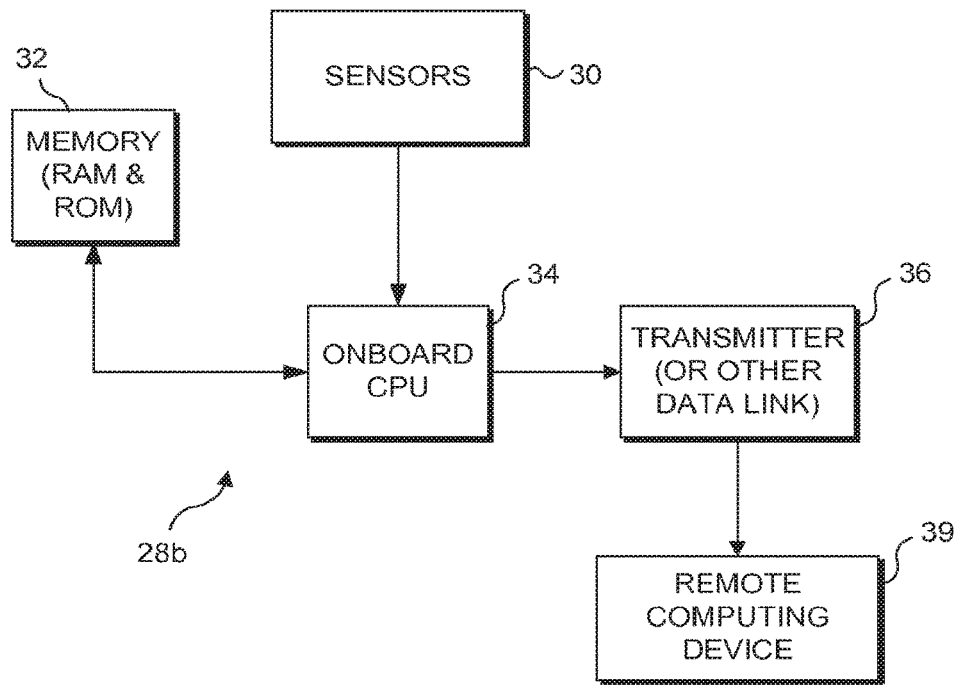
FIG. 3B is a functional block diagram illustrating the functional elements of an embodiment in which the metrics are processed by a computing device remote from the vehicle to obtain the driver's efficiency score for a specific metric and lost fuel costs.

FIG. 3B is a functional block diagram 28b illustrating the functional elements of an exemplary embodiment in which the metrics are processed by a computing device to obtain the driver's efficiency score, where the computing device is remote from the vehicle. Once again, the vehicle is equipped with sensors 30 configured to collect the required metrics. The sensors are logically coupled with an onboard vehicle CPU 34, which is configured to transmit the collected metrics to remote computing device 39 through transmitter 36 (or other data link). In a particularly preferred embodiment, transmitter 36 is a wireless transmitter. In such an embodiment, the method steps generally described above for processing the collected metrics at the remote computing device (i.e., blocks 16 and 18 of FIG. 1). CPU 34 is logically coupled to memory 32 in which the collected metrics can be stored, if the metrics are not to be transmitted to the remote computing device in real-time. Even if the metrics are transmitted to the remote computing device in real-time, such metrics can be stored in memory 32 as a backup in case the transmission is not successful. In such an embodiment, a display is not required.

Exemplary GPS Device with Onboard Computing Environment

FIG. 4 schematically illustrates a vehicle 23 that includes a GPS unit 27 configured to collect GPS data that can be used to determine if an enrolled vehicle is approaching a location for which a remote user has established zone based driver/vehicle definitions. Generally as discussed above in connection with FIG. 1, a remote monitoring service analyzes GPS data and other data received from enrolled vehicles to calculate a driver efficiency score for metrics related to fuel use. Vehicle 23, such as a bus or a truck (or automobile, or construction equipment, generally as described above) includes GPS unit 27 coupled with an ignition system 25 of the vehicle. In an exemplary embodiment, the GPS unit will be coupled with the ignition switch, such that it is assumed that when the ignition switch is on, the engine of the vehicle is actually running, and the GPS unit will be activated. As described in greater detail below, GPS data can be used for a plurality of metrics, including idle time, cruise control use, speed, and engine RPM, either independently or by being logically coupled to a vehicle data bus. The most basic GPS unit is able to determine a position of the vehicle at a specific time.

GPS unit 27 preferably includes or is connected to a wireless transmitter (not separately shown), such that the GPS data and other data used in calculating the driver fuel efficiency score can be wirelessly transmitted to a remote computing device, preferably in real-time. As noted above in connection with the method of FIG. 1, the remote computing device can be programmed to use empirical data from the vehicle to determine a driver's fuel efficiency score for one or more parameters, and to calculate how much fuel is lost in dollars based on less than 100% efficiency for any metric. It should be understood that the concepts disclosed herein encompasses coupling such a GPS unit to vehicle sensors and/or a vehicle data bus, such that driver metrics that require data from a vehicle ECU/data bus can be collected. While not specifically shown in FIG. 4, it should be understood that GPS unit 27 can include a processor that uses GPS data to determine if any zone based behaviors apply to the current vehicle location.

FIG. 5 is a functional block diagram of an exemplary telematics device added to an enrolled vehicle to implement one or more of the methods of disclosed herein. An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data connection component 168 (noting that in some embodiments a plurality of data connections are provided). Exemplary data connections include physical data links, as well as wireless data links such as Wi-Fi, IR, and Bluetooth™. Data connection component 168 enables vehicle data relevant to calculating driver fuel efficiency metrics (such as cruise control use, engine RPM, and incremental fuel use data from fuel injectors or fuel flow meters) to be collected along with GPS data and conveyed to a remote location for analysis. Data connection component 168 can also be used to send coaching data to a display or audio device to provide caching to a driver in real time, generally consistent with block 14 of FIG. 1.

The capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine RPM, gear selection, cruise control use, vehicle speed, and idle time), and to use the RF component to wirelessly convey such data to vehicle owners and/or a third party monitoring service, where such data can be analyzed to determine driver efficiency scores and fuel lost costs due to scores less than 100%, generally as discussed above in connection with FIG. 1. These data transmissions can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner/third party service using RF component 164. If desired, additional memory can be included to temporarily store data if the RF component cannot transfer data. In particularly preferred embodiments the RF components is GSM or cellular technology based. Data connection component 168 can also be used to logically couple telematics unit 160 to a driver input unit, which a driver can use to uniquely identify himself, so his efficiency data can be segregated from other drivers. Such an input device can be a keypad (for a PIN), a bar code reader, an RFID card reader, or a biometric scanner. In at least one embodiment the input device is a handheld device used for performing electronic vehicle inspections (such a device is disclosed in commonly owned U.S. Pat. No. 6,671,646).

In at least one embodiment, the controller is configured to implement steps 12 and 14 of FIG. 1. It should be understood that any of the vehicle based steps of FIG. 1 could be distributed to one or more other processors/controllers at the vehicle.

Exemplary Tablet for in Vehicle Use to Present Fuel Efficiency Coaching to Driver FIG. 6 is a functional block diagram of an exemplary mobile computing device 100 for fleet telematics including a display 106 and a controller 102 configured to present at least one telematics application to a user, and to present fuel efficiency coaching to a driver in real time, generally as discussed above in connection with block 14 of FIG. 1. A non-transitory physical memory 104 is included, upon which machine instructions define one or more applications are stored. Note that in embodiments including device 100 a coaching app can be stored in memory 104. Device 100 includes an optional RFID reader 108 (or other sensor) that enables drivers to log into the tablet, so that fuel efficiency related metrics can be tracked to a specific driver. In exemplary but not limiting embodiments, the device includes at least one data input 110 that can be used to logically couple the device to a vehicle data bus or some other device (such as telematics device 160 of FIG. 5). Note that in embodiments where driver coaching is implemented, controller 102 can implement that function so long as the controller has access to the empirical data required (idle time, speed, RPM data, and cruise control stats).

Device 100 may include additional components, including but not limiting to a GSM component, a Wi-Fi component, a USB component, a rechargeable battery, and in at least one embodiment a GPS component (in which case the GPS devices of FIGS. 4 and 5 are not required).

Significantly, the display (or speakers) of device 100 can be used to provide the fuel efficiency coaching function of FIG. 1 (block 14). Controller 102 can be employed in some embodiments to implement one of more of the vehicle side steps of FIG. 1.

FIG. 7 is a functional block diagram of device 100 implementing a navigation app that is presented to the driver during vehicle operation on display 106. Significantly, an info pane 112 is not consumed by the map portion, and remains visible to the driver. Any fuel efficiency driver coaching (slow down, stop idling, change RPM, use cruise control) can be visually presented to the driver on info pane 112 without losing the navigation view.

In one preferred embodiment, each driver is provided with an RFID tag, which can be scanned into device 100, or a secret pin number to identify him or herself to the tablet. As fuel efficiency scores may be important to a driver's career development, it is important to have a system for unerringly identifying the driver credited with such scoring. Other applications, such as the driver log application and inspection application, will similarly employ verifiable credentials. In at least one embodiment, the tablet cannot be used without first logging onto the tablet using verifiable credentials.

Exemplary Accessory Display for Presenting Fuel Efficiency Coaching to Driver

Another aspect of the concepts disclosed herein is an accessory display that can be used in connection with a telematics device that itself might not include a display, such as the GPS based devices of FIGS. 4 and 5, to provide a display upon which fuel efficiency coaching (block 14 of FIG. 1) can be presented to the driver when behavior that reduces fuel efficiency scores is detected.

FIG. 8 schematically illustrates an accessory display 115 that can be used along with a processor in the vehicle to visually present fuel efficiency coaching to a driver, in accord with the concepts disclosed herein, where the accessory display can also be used to uniquely log in drivers, so any empirical data used to generate fuel efficiency scores identify the correct driver. The accessory display does not possess significant processing power, and is used in connection with some other device at the vehicle that provides the required processing of vehicle data in order to what determine what coaching to provide. A data port on the back enables the accessory device to be logically coupled to the device (such as the devices of FIGS. 4 and 5) providing the processing. The accessory device does not need to include a wireless data link when used in connection with other devices having such functionality. The accessory display provides two basic functions (possibly three if equipped with audio). First, the accessory display provides fuel efficiency coaching to the driver in response to a controller in the vehicle identifies empirical data that will tend to lower the drivers fuel efficiency score for a particular fuel efficiency metric. Second, the accessory display enables drivers to uniquely identify themselves using RFID cards (i.e., the accessory display includes an RFID card reader). If desired, the accessory display can include a speaker to provide audible feedback as well. Also if desired, the RFID component can be eliminated, however, it is desirable to provide some other mechanism to enable drivers to uniquely log into to the system (perhaps using a keyboard, biometric device, or other input device in the vehicle).

Note than an icon of a hand holding a card is shown on the front of the accessory display. The icon provides the driver a visual reference of where the RFID driver card needs to be relative to the accessory display in order to be read.

Exemplary System Environment

FIG. 9 is a functional block diagram of an exemplary system employed to implement some of the concepts disclosed herein. The functional block diagram illustrates exemplary components used in each vehicle 128 that is enrolled in fuel efficiency and lost fuel cost monitoring service, to implement some of the method steps discussed above. An exemplary driver fuel efficiency and lost fuel cost monitoring service is based on adding a memory 136 and a bi-directional data link 134 to each enrolled vehicle (in an exemplary, but not limiting embodiment, the data buffer and data link are combined into a single component). GPS data and other data can be temporarily stored in the memory in the event an RF connection is not available to upload the data. In an exemplary embodiment, the data link is a combination radio frequency (RF) transmitter and receiver, although separate transmitters and receivers could be used (note the term RF specifically encompasses cellular telephone based data links). A data terminal can optionally be included in the vehicle to facilitate operator entry of information and operator transmission of information that is presented to the operator on a display within the vehicle. While RF data transmission represents an exemplary embodiment, other types of data transmission could be employed. If the vehicle does not already include GPS (i.e. position) data collecting components 130, such components are added (noting that the collection of other types of data, particularly data than can show whether a driver is using cruise control, idle time data, speed data, and RPM data) is implemented in some embodiments. Most vehicles manufactured today include operational data collecting components already, as many of today's vehicles are designed to use such continuously generated operational data to control operation of the vehicle in real-time, and such vehicles generally include data collecting components, data buses, and controllers that use the operational data to control the operation of the vehicle. The vehicle includes at least one processor 132 that performs the function of managing the transmission of GPS data from the vehicle to the remote monitoring service, collecting the fuel efficiency related driver metrics, and implementing any real time driver coaching. In general, processor 132 can be used to implement the vehicle side processor functions of the methods of FIG. 1, noting that multiple processors can be employed as well, such that not all functions are implemented by the same processor.

An output 138 is also included, to present driver coaching, generally as discussed above in connect ion with block 14 of FIG. 1. Output 138 can be implemented using a speaker providing an audible output, and using a display providing a visual output. Note that output 138 can be combined into a single component with the memory, GPS collecting component, processor and the data link, so only a single additional component is added to the vehicle. In some embodiments, output 138 is a speaker system already installed in the vehicle, such as an OEM stereo system. In some embodiments, the display and or speakers are part of a smart phone or mobile computing device used by the driver in the vehicle (see element 144).

In a related preferred embodiment the processor, the GPS component, any buffer, and data link are combined into a single telematics device, and an additional display may be required (such as the accessory of FIG. 8). Such a device will send GPS and vehicle/driver data to the remote computing device discussed above at a plurality of different times during the course of the operation of the vehicle. In general, the telematics device will transmit data at intervals ranging from as frequently as every 5 to 15 seconds, or as rarely as every 5 minutes, recognizing that such intervals can vary, and are intended to be exemplary, and not limiting.

As indicated in FIG. 9, a remote computing device 140 (or network of devices operated by the monitoring service) is logically coupled via a network 142 (such as the Internet) to one or more computing devices 146 accessible to a vehicle operator (noting that in at least some embodiments', the monitoring service performs the monitoring function for a plurality of different vehicle operators/fleets). Also shown is an optional driver computing device 144 (such as a personal computer, a tablet, or a smart phone). In some embodiments, fleets operators may want to give drivers access to a webpage similar to that shown in FIG. 1, so that drivers can review their fuel efficiency reports (noting only one such driver device is shown in the Figure; however, the monitoring service will likely be monitoring the performance of a plurality of drivers, each likely having access to a different computing device 144). Network 142 facilitates communication between computing devices 140, 144, and 146, enabling the monitoring service to efficiently communicate with drivers and vehicle operators. It should be noted that the concepts disclosed herein encompass embodiments where the monitoring service and vehicle operator are the same entity.

The concepts disclosed herein are in at least some embodiments intended to be used by fleet owners operating multiple vehicles, and the GPS data conveyed to the remote location for monitoring will include an ID component that enables each enrolled vehicle to be uniquely identified.

Exemplary Computing Environment

FIG. 10 is a functional block diagram of an exemplary computing device that can be employed to implement some of the method steps disclosed herein. It should be understood that the concepts disclosed herein encompass processing of data collected at a vehicle both in the vehicle and at a remote computing device.

FIG. 10 schematically illustrates an exemplary computing system 250 suitable for use in implementing the processing functions disclosed herein. Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of GPS data and driver fuel efficiency data collected from enrolled vehicles, to generate one or more driver fuel efficiency reports. Exemplary reports simultaneously display the driver fuel efficiency score and a lost dollar amount due to extra fuel use. The machine instructions implement functions generally consistent with those described above. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to monitor vehicle position data and driver fuel; efficiency metrics to calculate a driver fuel efficiency score, and in some embodiments a dollar cost due to extra fuel use). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. In embodiments where computing system 250 is implemented in a vehicle ti implement one or more of the steps of FIG. 1, the computing system 250 can be configured to run autonomously, such that a user input device not regularly employed.

Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. In embodiments where computing system 250 is implemented in a vehicle, the computing system 250 can be configured to run autonomously, such that a user output device not regularly employed (except for embodiments providing driver fuel efficiency coaching).

Data link 264 is configured to enable data to be input into computing system 250 for processing. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

Note that location data from the enrolled vehicles will be communicated wirelessly in at least some embodiments, to the remote computing system that analyzes the data to calculate the driver fuel efficiency metrics and lost dollar costs due to extra fuel use.

It should be understood that the terms "remote computer", "computing device", and "remote computing device" are intended to encompass a single computer as well as networked computers, including servers and clients, in private networks or as part of the Internet. The location data and driver compliance data (compliance with zone based driver behavior rules) received by the monitoring service from the vehicle can be stored by one element in such a network, retrieved for review by another element in the network, and analyzed by yet another element in the network. While implementation of the methods noted above have been discussed in terms of execution of machine instructions by a processor (i.e., the computing device implementing machine instructions to implement the specific functions noted above), the methods could also be implemented using a custom circuit (such as an application specific integrated circuit or ASIC).

Exemplary User Reports

FIG. 11 is a data table illustrating why simply calculating MPG does not inform a fleet operator which drivers are operating most efficiently. Driver #1 only had a fuel efficiency of 6.49 for his trip, while Driver #2 had a fuel efficiency of 7.14 for his trip. Driver #2 is the more efficient driver, correct? No! Driver 1 was carrying a heavier load through the mountains. Driver #2 carried a lighter load over flat terrain. Driver #1 frequently used cruise control, had few overspeed events, and operated in the RPM sweet zone for most of the trip. Driver #2 did not use cruise control, had more overspeed events, and did not operate in the RPM sweet zone for as much of the trip. Driver #2 cost the fleet $114 by poor fuel efficient driving techniques. Multiply that by many drivers over an entire year, that is a lot of wasted fuel.

FIG. 12 is an exemplary screen shot of a webpage (our GUI in a stand-alone software application, noting that when the term webpage is used herein, it should be understood that the same information can be generated in a stand-alone software product as long as the software has access to the data) accessed by a user to see detailed analytical information that can be used to understand that Driver #2 from FIG. 11 performed less efficiently, even though that driver had a higher MPG for his trip. The report of FIG. 12 relatively large amounts of fuel were wasted by not using cruise control and not using the most efficient RPM range. Slightly less fuel was wasted by speeding. While some fuel was lost idling, that amount was negligible. A driver manager can readily use this information as a training to, to quickly point out to a driver what areas need improvement. Some fleets may want to provide copies of this report to each driver on a daily basis.

FIG. 13 is an exemplary screen shot of a webpage 300 accessed by a user to see detailed analytical information that can be used to understand how well a driver performed based on an RPM fuel efficiency metric tracking the drivers use of a most efficient RPM range, and how that efficiency rating translated into additional fuel costs. Webpage 300 includes an interactive map portion 302 that enables the user to view the trip. Webpage 300 includes a graph 304 of the entire trip, with RMP versus time. A sweet zone for RPM is shown in a shaded portion 306, so the user can easily tell when the driver operated over or under that sweet zone. Selecting a specific portion of the graph will change the view of the map, so the user can understand the geographical location associated with the poor use of RPM. Webpage 300 includes an RPM efficiency measurement 308, enabling the user to understand that this driver has a relatively good efficiency score for his use of RPM (lower percentage scores are better, the lower the score, the less time spent outside of the sweet zone for RPM, the higher the score, the more time spent outside the sweet zone, a fuel wasting behavior). Webpage 300 includes a fuel usage table 310 that provides detail regarding how much fuel was inside the RPM sweet zone and outside the RPM sweet zone. The user is able to quickly understand how much the poor fuel efficiency driving behavior cost in the terms of dollars.

Referring to RPM efficiency measurement 308, the 25.9% refers to the amount of time spent driving outside the sweet zone (where 100% would be spending all the driving time outside of the sweet zone), whereas fuel usage table 310 shows how much fuel was lost during that time. In terms of this report, a relatively higher number for RPM efficiency measurement 308 indicates relatively poor performance. For example, a 100% efficiency for RPM efficiency measurement 308 would mean the driver spent all of his driving time operating outside of the preferred RPM sweet zone. It should be understood that if desired to RPM efficiency measurement 308 could be reported in an inverse fashion, such that 100% indicated the best performance (i.e., the driver spent 100% of his time operating in the RPM sweet zone). The empirical data used to generate the data shown on webpage 300 reports that 23.45 gallons of fuel was used to travel 172.3 miles. In the RPM fuel efficiency analysis presented here, an assumption was made that about 7% fuel efficiency gain can be made by operating in the RPM sweet zone. Since 25.9% of the trip (44.6 of 172.3 miles) was outside the sweet zone, a rough calculation based on a 7% fuel loss from being outside the sweet zone would be about 7% of ¼ (the 25.9% value) of the fuel used for the trip. In this case one could estimate 25.9%*7%*23.45 gallons=0.43 gallons of fuel lost outside the sweet zone. Referring to fuel usage table 310, the reported amount of fuel lost is 0.463 gallons, which is fairly close to that rough estimate. The amount reported in table 310 is based on looking at the MPG for each segment of the trip, generally as discussed above, so it is more accurate than the rough calculated noted above. While 0.463 gallons does not seem like a lot, it does add up quickly over multiple vehicles and multiple days, and it is based on a discretionary behavior that can be modified with no safety issue. In a worst case scenario (the driver was 100% outside the sweet zone), for the trip data used in FIG. 13, the amount reported in table 310 would be (23.45 gallons*7%=) 1.64 gallons of fuel lost to being outside the sweet zone.

FIG. 14 is an exemplary screen shot of a webpage accessed by a user to see detailed analytical information that can be used to understand how well a driver performed based on a cruise control usage fuel efficiency metric tracking the driver's use of cruise control at highway speeds, and how that efficiency rating translated into additional fuel costs. Webpage 312 includes an interactive map portion 302 that enables the user to view the trip. Webpage 312 includes a graph 314 of the entire trip, with speed versus time. A dashed line indicates the speed at which cruise ideally should be used (here 55 MPH), so the user can easily tell when the driver had the opportunity to use cruise control. Selecting a specific portion of the graph will change the view of the map, so the user can understand the geographical location associated with the poor use of cruise control. Webpage 312 includes a pie chart 318 showing portions of the trip where cruise was not possible, portions where cruise was possible and not used, and portions where cruise was possible and used, with the relative percentages, enabling the user to understand that this driver had a very poor efficiency score for his use of cruise (no cruise use), and that he could have used cruise 73.8% of the trip. Webpage 312 includes a fuel usage table 316 that provides detail regarding how much fuel was used with cruise enabled (none here), how much fuel was used in segments where cruise was not possible (under 55 MPH; here 10.531 gallons), and how much fuel was used in segments where cruise was possible but not used (here 13.386 gallons). The user is able to quickly understand how much fuel was consumed in segments of the trip where no cruise was employed (i.e., less efficient operation). Preferably, very little fuel should be reported being used as "potential w/o cruise."

FIG. 15 is an exemplary screen shot of a webpage accessed by a user to see detailed analytical information that can be used to understand how well a driver performed based on a top gear usage fuel efficiency metric tracking the driver's use of top gear, and how that efficiency rating translated into additional fuel costs. In this report, in contrast to webpage 300 of FIG. 13, a relatively higher percentage mean relatively better driver performance. Webpage 300 includes an interactive map portion 302 that enables the user to view the trip. Webpage 320 includes map portion 302 so users can see the vehicles entire trip. In a default setting, the entire trip is shown, and users can manipulate the map to zoom into portions of the trip. A graph 322 of the entire trip is included on webpage 320, with gear position versus time. Selecting a specific portion of the graph will change the view of the map, so the user can understand the geographical location associated with the poor use of gear (i.e., lower rather than higher). Webpage 320 includes a top gear efficiency measurement 326, enabling the user to understand that this driver has a relatively good efficiency score for his use of top gear (higher percentage scores are better, the higher the score, the less fuel wasting behavior). Webpage 320 includes a fuel usage table 324 that provides detail regarding how much fuel was in top gear and how much fuel was used in less efficient lower gears. The user is able to quickly understand how much the use of poor gear choice (a less fuel efficient driving behavior) cost in the terms of dollars.

It should be understood that in at least some embodiments, where a combined fuel efficiency percentage score is calculated for a driver using RPM sweet zone data, that the top gear efficiency data is not included in that combined score. That is because if a driver uses good RPM practice, his top gear use might drop (for instance when pulling a heavy load a lower gear selection might be required to keep the engine operating in the RPM sweet zone). Since the RPM sweet zone represents a fuel efficient operating range (not to mention reducing engine wear and tear), such an embodiment does not penalize drivers for operating in a lower gear. Even in such embodiments, the top gear metric of FIG. 15 may still be made available (just not used for the combined efficiency score along with RPM efficiency). The report of FIG. 15 is particularly valuable to long distance fleet operators whose driver's spend a lot of time on interstate highways, where there ought to be a statistically high opportunity to use an efficient top gear.

FIGS. 16A and 16B provide details an exemplary technique to generate the top gear metric of FIG. 15 using data collected from the vehicle and an understanding of the vehicle's design characteristics. The top gear calculation requires data to be collected from the vehicle, and for specific transmission information to be known about the vehicle. Data collected from the vehicle is sent to a remote server (over the "cloud") and a top gear efficiency analysis is performed and reported to a user on a webpage such as that shown in FIG. 15. The top gear analysis is based on obtaining RPM, speed, odometer and location data from the vehicle during vehicle operation. That data, in connection with known gear ratio data for the specific transmission in that vehicle, is used to generate the report of FIG. 15, generally using the process shown in FIG. 16B.

FIGS. 17A and 17B are portions of an exemplary graphical user interface (or webpage) providing a summary of the fuel efficiency metrics disclosed herein for a plurality of drivers. FIGS. 17A and 17B are screen shots of an exemplary webpage (too wide to display on a single page using acceptably sized font) that presents driver efficiency metrics for a plurality of drivers. This webpage is intended to be viewed by fleet managers to gather a quick understanding of empirically measured driver efficiencies. The report is based on an average fuel cost that can be selected by the user (that function not shown in these FIGURES, but the functionality is there). For each vehicle on a specific day (or month, or week, that is a user definable parameter, noting that individual vehicles, or subsets of all fleet vehicles are similarly selectable), various columns of data are provided, including: Distance (i.e., miles driven); Fuel used (in gallons); MPG; Moving MPG (all idle time or PTO time removed); poetantial MPG (based on empirically measured driver controlled fuel efficiency robbing behavior); Potential Moving MPG; Driver Efficiency Score; $/Mile costs; Total Loss (in $, based on empirically measured driver controlled fuel efficiency robbing behavior); Average RPM; Top Gear Use (percentage); Total Cruise (%); Achievable Cruise (%); Outside Sweet Zone (RPM; %); Idle Fuel (gallons); and Idle Minutes. The information is sortable, so relatively better performing and/or relatively poorer performing drivers can be filtered or sorted. Not shown in this screen shot is a column reporting overspeed percentage efficiency that is discussed above, but that column is available, and in some embodiments is factored into the Driver Efficiency Score.

Of particular interest is the Driver Efficiency score. A relatively higher score mean more fuel efficient performance. An exemplary calculation is provided below based on a trip that consumed 50 gallons of fuel. That single metric enables fleets operators to quickly identify their most efficient, and least efficient drivers. The additional information in this report can be used to identify which behavior for a specific driver represents the most cost saving opportunity (i.e., what behavior has the most significant costs associated with it). The driver efficiency score is based on a combination of how many gallons of fuel the driver wasted by operating the vehicle outside of the RPM sweet zone, how many gallons of fuel the driver wasted by operating the vehicle without using cruise control (where the vehicle was going fast enough to make cruise reasonable; i.e., not in traffic); how many gallons of fuel the driver wasted by idling (over some predetermined limit, usually 5 minutes), and how many gallons of fuel the driver wasted by exceeding a predetermined speed limit.

Another column of particular interest is the Total Loss column. A driver that had poor efficiency over a short trip wastes less fuel than a driver with a higher score may waste over a much longer trip. Thus this column allows fleet operator to see where they are losing the most money in what effectively is a controllable expense.

The average RPM column enables driver managers to quickly determine if the average RMP of the trip varied substantially from the most fuel efficient sweet zone. That column provides qualitative information about the driver's relative performance, without providing any empirical data about how much fuel might have been wasted. The Top Gear percentage column similarly enables driver managers to quickly determine if a driver often used top gear or not. The top gear column provides qualitative information about the driver's relative performance, without providing any empirical data about how much fuel might have been wasted.

The Total Cruise and Achievable Cruise are viewed together. While it would be possible to derive a cruise efficiency metric where a 100% score was always possible, because the driver always used cruise whenever cruise actually could be used. In the report of FIGS. 17A and 17B, Total Cruise and Achievable Cruise are both reported. If they match, then the driver did as much as he possibly could with respect to using cruise control. If the Total Cruise is 25% and the Achievable Cruise is 50%, that means that cruise could not have been used 50% of the time, and that the driver actually only used cruise ½ of the time he could have. Note that because the driver efficiency metric is based on the gallons wasted, scoring only 50% Total Cruise where only 50% Achievable Cruise applies does not reduce your Driver Efficiency Score at all, because you would have no fuel lost due to failure to use cruise.

Similar to what is discussed in FIG. 13, the outside sweet zone metric is inversed relative to other metrics, in that a 0% score is the best possible score. So drivers have a relatively higher score performed relatively poorer. Again, it is possible to combine the Total Cruise, Outside Sweet Zone, Over Speed, and Idle efficiency metrics together to achieve the combined Driver Efficiency Score, even though for some of the metrics 100% is the best, and in others 100% is the worst, because the Driver Efficiency Score is based on gallons wasted for each metric (an exemplary Driver Efficiency Score calculation is provided below).

The Idle Fuel consumed and Idle Minutes enable driver managers to understand which drivers need coaching to reduce fuel wasted during idle.

It should be noted that in some embodiments, the relatively efficiency scores are not based on all trip segments (i.e., the distance between incremental fuel readings), but only trip segments where the driver's behavior could reduce fuel costs without sacrificing safety. Thus, in some embodiments, downhill segments are ignored, because safe driving practices (engine breaking) may force the driver outside of the RPM sweet zone. Cruise control is also ignored in some embodiments when driving downhill, again for safety reasons. With respect to cruise control, segments where speed is less than about 50 MPH (user selectable), usage of cruise is not scored, because it would be unsafe to use cruise in something like stop and go driving.

Summary of an Exemplary Fuel Efficiency Score

In general, the trucking industry believes that driver specific behavior can effect up to 30% of the fuel used. For a trip that consumes 50 gallons of fuel, that variance is 15 gallons. In other words, driver behavior could enable that same trip to be completed using 35 gallons.

The concepts disclosed herein are based on identify a number of different driver behaviors that affect fuel use, and assigning a percentage value to that behavior. The assigned value may not be absolutely correct, but when used to evaluate all drivers in a fleet using empirical data collected during vehicle operation, inefficient operating patterns can be readily identified in specific drivers, such that driver coaching or driver training (alone or in combination with driver incentives) can be used to reduce inefficient driving behavior.

Referring once again to that 50 gallon hypothetical, and hypothetical data collected from vehicle operation, one may determine that not using cruise control during the trip lost 5 gallons of fuel (5/50=10%), that operating the vehicle outside of the RPM sweet lost 1 gallon of fuel (1/50=2%); that going over the speed threshold lost 2 gallons of fuel (2/50=4%), and for this trip there was no fuel lost due to excess idle (0/50=0%). Combining those efficiency percentage one determines that the driver could have saved 16% (8 gallons) of the total 50 gallons on this trip. So of the 30% (15 gallons) maximum the driver could have saved he lost 16% (8 gallons). This is then used to get the driver combined fuel efficiency metric:

15 gallons−8 gallons=7 gallons.

30%−16%=14%

7 gallons/15 gallons=46.66% Driver Efficiency

14%/30%=46.66% Driver efficiency

In another example also based on 50 gallons, assume a driver had only lost 2% of the fuel (1 gallon) to being outside the sweet zone, and didn't do anything else wrong.

15 gallons−1 gallon=14 gallons

30%−2%=28%

14 gallons/15 gallons=93.33% Driver Efficiency

28%/30%=93.33% Driver Efficiency

So, the more fuel the driver could have saved, the worse their driver efficiency score.

Although the concepts disclosed herein have been described in connection with the preferred form of practicing them and modifications thereto, those of ordinary skill in the art will understand that many other modifications can be made thereto within the scope of the claims that follow.

The invention in which an exclusive right is claimed is defined by the following:

1. A method to improve operating efficiency of a vehicle, comprising:
   operating the vehicle over a plurality of selected segments, each segment having an associated segment length;
   selecting, with a computing device, one or more driver-controllable fuel efficient behavior metrics on which to generate a driver efficiency score, the one or more driver-controllable fuel efficient behavior metrics drawn from a plurality of driver-controllable fuel efficient behavior metrics including:
     an amount of time that the vehicle is idling or not idling within each of the plurality of selected segments,
     an amount of time that the vehicle is operated above or below a determined engine speed within each of the plurality of selected segments,
     an amount of time that the vehicle is operated above or below a determined vehicle speed within each of the plurality of selected segments, and
     an amount of time that the vehicle is operated using or not using cruise control within each of the plurality of selected segments;
   within each of the plurality of selected segments, automatically collecting vehicle data associated with each selected driver-controllable fuel efficient behavior metric, the vehicle data automatically collected with a plurality of independent sensors including at least one engine-based sensor and at least one telematics sensor;
   ignoring incidents of cruise control not being used for downhill driving conditions;
   selecting at least one model efficiency factor associated with each selected driver-controllable fuel efficient behavior metric;
   calculating with the computing device a plurality of interim driver efficiency values, the plurality of interim driver efficiency values including at least one interim driver efficiency value per selected segment and per selected driver-controllable fuel efficient behavior metric, each interim driver efficiency value calculated using automatically collected vehicle data and a selected model efficiency factor;
   calculating a driver efficiency score that is between a lowest efficiency value and a highest efficiency value, the driver efficiency score calculated with the computing device from some but not all of the plurality of interim driver efficiency values;
   determining how much fuel is consumed by the vehicle within each of the plurality of selected segments;
   determining an amount of fuel used by the vehicle when the driver could have used cruise control but did not;
   applying a corrective factor based on efficiency gains related to cruise control use to determine an amount of fuel wasted when not using cruise control;
   determining whether or not the driver efficiency score is less than the highest efficiency value;
   based on a determination that the driver efficiency score is less than the highest efficiency value, calculating a value representative of the fuel wasted within each of the plurality of selected segments due to the one or more driver-controllable fuel efficient behaviors; and
   in response to a user request, concurrently displaying the driver efficiency score and the value representative of the fuel wasted.

2. The method of claim 1, further comprising:
   determining an amount of fuel used by the vehicle when the driver operated the vehicle at an engine speed outside of a predetermined range;
   applying a corrective factor based on efficiency gains related to operating the vehicle at an engine speed within the predetermined range; and
   determining an amount of fuel wasted by not operating the vehicle at the engine speed within the predetermined range.

3. The method of claim 2, wherein determining an amount of fuel used by the vehicle when the driver operated the vehicle at the engine speed outside of the predetermined range includes:
   ignoring engine speed during downhill driving conditions.

4. The method of claim 1, further comprising:
   determining an amount of fuel used by the vehicle when the driver operated the vehicle at a speed greater than a predetermined speed value;
   applying a corrective factor based on an effect of speed on fuel efficiency; and
   determining an amount of fuel wasted by operating the vehicle at the speed greater than the predetermined speed value.

5. The method of claim 1, further comprising:
   determining an amount of fuel wasted when the vehicle has idled for longer than a predetermined idle value.

6. The method of claim 1,
   wherein automatically collecting vehicle data includes:
     collecting incremental fuel use data correlated with location data; and
   wherein calculating the driver efficiency score includes:
     segmenting operation of the vehicle into a plurality of segments, each segment associated with a sequential incremental fuel use reading;
     calculating an amount of fuel consumed during each segment;
     calculating a length of each segment using the location data;
     determining a vehicle fuel efficiency for each segment;
     associating the vehicle fuel efficiency for each segment with the driver-controllable fuel efficient behavior; and
     producing a per segment cost of fuel wasted.

7. A method to analyze how efficiently a driver operates a vehicle, comprising:
   defining, with a computing device, a plurality of data parameters under driver control that affect vehicle efficiency;
   automatically collecting vehicle data associated with each data parameter of the plurality of defined data parameters during vehicle operation, each data parameter automatically collected using a plurality of sensors at the vehicle, the plurality of sensors including at least one engine-based sensor and at least one telematics sensor;
   ignoring one or more selected data parameters of the plurality of data parameters when the vehicle is going downhill;
   calculating, with the computing device, a driver efficiency score based on remaining data parameters that were not ignored; and
   in response to a user request, displaying the driver efficiency score.

8. The method of claim 7, comprising:
operating the vehicle over a plurality of selected segments, each segment having an associated segment length;
determining how much fuel is consumed by the vehicle within each of the plurality of selected segments;
determining an amount of fuel used by the vehicle when the driver operated the vehicle at an engine speed outside of a predetermined range;
determining an amount of fuel wasted by not operating the vehicle at an engine speed within the predetermined range; and
in response to the user request, concurrently displaying the driver efficiency score and a value representative of the amount of fuel wasted.

9. The method of claim 7, further comprising:
ignoring incidents of cruise control not being used for downhill driving conditions;
determining an amount of fuel used by the vehicle when the driver could have used cruise control but did not; and
applying a corrective factor based on efficiency gains related to cruise control to determine an amount of fuel wasted when not using cruise control.

10. The method of claim 9, wherein determining the amount of fuel used by the vehicle when the driver could have used cruise control but did not includes:
ignoring incidents of cruise control not being used for downhill driving conditions.

11. The method of claim 7, further comprising:
determining an amount of fuel used by the vehicle when the driver operated the vehicle at a speed greater than a predetermined speed value;
applying a corrective factor based on an effect of speed on fuel efficiency; and
determining an amount of fuel wasted by operating the vehicle at the speed greater than the predetermined speed value.

12. The method of claim 7, further comprising:
determining an amount of fuel wasted when the vehicle has idled for longer than a predetermined idle value.

13. The method of claim 7,
wherein automatically collecting vehicle data includes:
collecting incremental fuel use data correlated with location data; and
wherein calculating, with the computing device, the driver efficiency score includes:
segmenting operation of the vehicle into a plurality of segments, each segment associated with a sequential incremental fuel use reading;
calculating an amount of fuel consumed during each segment;
calculating a length of each segment using the location data;
determining a vehicle fuel efficiency for each segment;
associating the vehicle fuel efficiency for each segment with a driver-controllable fuel efficient behavior; and
producing a per segment cost of fuel wasted.

14. A system to improve operating efficiency of a vehicle, comprising:
a global processing unit that provides location data when a driver is operating the vehicle over a plurality of selected segments, each segment having an associated segment length;
a computing device that selects one or more driver-controllable fuel efficient behavior metrics on which to generate a driver efficiency score, the one or more driver-controllable fuel efficient behavior metrics drawn from a plurality of driver-controllable fuel efficient behavior metrics including:
an amount of time that the vehicle is idling or not idling within each of the plurality of selected segments,
an amount of time that the vehicle is operated above or below a determined engine speed within each of the plurality of selected segments,
an amount of time that the vehicle is operated above or below a determined vehicle speed within each of the plurality of selected segments, and
an amount of time that the vehicle is operated using or not using cruise control within each of the plurality of selected segments;
a plurality of independent sensors including at least one engine-based sensor and at least one telematics sensor that provide vehicle data when the vehicle is operating within each of the plurality of selected segments, the vehicle data associated with each selected driver-controllable fuel efficient behavior metric, wherein the computing device is arranged to:
ignore incidents of cruise control not being used for downhill driving conditions;
select at least one model efficiency factor associated with each selected driver-controllable fuel efficient behavior metric;
calculate a plurality of interim driver efficiency values, the plurality of interim driver efficiency values including at least one interim driver efficiency value per selected segment and per selected driver-controllable fuel efficient behavior metric, each interim driver efficiency value calculated using at least some of the vehicle data and a selected model efficiency factor;
calculate a driver efficiency score that is between a lowest efficiency value and a highest efficiency value, the driver efficiency score calculated using some but not all of the plurality of interim driver efficiency values;
determine how much fuel is consumed by the vehicle within each of the plurality of selected segments;
determine an amount of fuel used by the vehicle when the driver could have used cruise control but did not;
apply a corrective factor based on efficiency gains related to cruise control use to determine an amount of fuel wasted when not using cruise control;
determine whether or not the driver efficiency score is less than the highest efficiency value; and
based on a determination that the driver efficiency score is less than the highest efficiency value, calculate a value representative of the fuel wasted within each of the plurality of selected segments due to the one or more driver-controllable fuel efficient behaviors; and
a display device that displays, in response to a user request, the driver efficiency score and the value representative of the fuel wasted.

15. The system of claim 14, wherein the computing device is further arranged to:
determine an amount of fuel used by the vehicle when the driver operated the vehicle at an engine speed outside of a predetermined range;
apply a corrective factor based on efficiency gains related to operating the vehicle at an engine speed within the predetermined range; and
determine an amount of fuel wasted by not operating the vehicle at the engine speed within the predetermined range.

16. The system of claim 15, wherein determining an amount of fuel used by the vehicle when the driver operated the vehicle at the engine speed outside of the predetermined range includes:
ignoring engine speed during downhill driving conditions.

17. The system of claim 14, wherein the computing device is further arranged to:
determine an amount of fuel used by the vehicle when the driver operated the vehicle at a speed greater than a predetermined speed value;
apply a corrective factor based on an effect of speed on fuel efficiency; and
determine an amount of fuel wasted by operating the vehicle at the speed greater than the predetermined speed value.

18. The of claim 14, wherein the computing device is further arranged to:
determine an amount of fuel wasted when the vehicle has idled for longer than a predetermined idle value.

19. The system of claim 14,
wherein automatically collecting vehicle data includes:
collecting incremental fuel use data correlated with location data; and
wherein calculating the driver efficiency score includes:
segmenting operation of the vehicle into a plurality of segments, each segment associated with a sequential incremental fuel use reading;
calculating an amount of fuel consumed during each segment;
calculating a length of each segment using the location data;
determining a vehicle fuel efficiency for each segment;
associating the vehicle fuel efficiency for each segment with the driver-controllable fuel efficient behavior; and
producing a per segment cost of fuel wasted.

* * * * *